US007934662B1

(12) United States Patent
Jenkins

(10) Patent No.: US 7,934,662 B1
(45) Date of Patent: May 3, 2011

(54) THERMOSTATIC WATER MIXING UNIT

(76) Inventor: Robert Jenkins, Hobe Sound, FL (US)

( * ) Notice: Subject to any disclaimer, the term of this patent is extended or adjusted under 35 U.S.C. 154(b) by 447 days.

(21) Appl. No.: 12/032,573

(22) Filed: Feb. 15, 2008

(51) Int. Cl.
*G05D 23/13* (2006.01)

(52) U.S. Cl. ..................................... 236/12.1; 236/12.13

(58) Field of Classification Search ................. 236/12.1, 236/12.11, 12.12, 12.13; 137/337
See application file for complete search history.

(56) References Cited

U.S. PATENT DOCUMENTS

| | | | | |
|---|---|---|---|---|
| 1,153,547 | A | | 9/1915 | Finney |
| 1,183,599 | A | | 5/1916 | Sparks |
| 1,996,330 | A | | 4/1935 | Goshaw |
| 2,241,302 | A | | 5/1941 | Gaskill |
| 2,296,917 | A | | 9/1942 | Garrett et al. |
| 2,463,640 | A | | 3/1949 | Plett |
| 2,828,766 | A | | 4/1958 | Postmus |
| 3,441,212 | A | | 4/1969 | Renne |
| 3,724,485 | A | * | 4/1973 | Cox et al. .................. 137/115.1 |
| 4,711,393 | A | | 12/1987 | Lee |
| 4,901,915 | A | * | 2/1990 | Sakakibara ................ 236/12.12 |
| 4,909,435 | A | * | 3/1990 | Kidouchi et al. .......... 236/12.12 |
| 4,923,116 | A | | 5/1990 | Homan |
| 5,012,536 | A | | 5/1991 | Rivera |
| 5,979,776 | A | | 11/1999 | Williams |
| 6,286,764 | B1 | * | 9/2001 | Garvey et al. .............. 236/12.12 |
| 6,676,024 | B1 | * | 1/2004 | McNerney et al. ........ 236/12.12 |
| 6,688,530 | B2 | | 2/2004 | Wack et al. |
| 6,705,534 | B1 | | 3/2004 | Mueller |
| 7,036,535 | B1 | | 5/2006 | Chandler |
| 2005/0205680 | A1 | * | 9/2005 | Valente ...................... 236/12.11 |

FOREIGN PATENT DOCUMENTS

| | | |
|---|---|---|
| EP | 0300639 | 1/1989 |
| JP | 60044733 | 3/1985 |
| JP | 60142149 | 7/1985 |
| JP | 2064327 | 3/1990 |

* cited by examiner

*Primary Examiner* — Marc E Norman
(74) *Attorney, Agent, or Firm* — Michael I. Kroll

(57) ABSTRACT

An automated water control system for a shower or bath that provides means for automated controls that give the user management of both water temperature and water flow as well as historical statistics on consumption.

3 Claims, 21 Drawing Sheets

THERMOSTATIC WATER MIXING UNIT

BACKGROUND OF THE INVENTION

1. Field of the Invention

The present invention relates generally to fluid handling and, more specifically, to an automated water control system for a shower or bath that provides means for automated controls that give the user management of both water temperature, water flow and water consumption.

The automated water control system of the present invention provides a control panel preferably a touch screen LCD or push button display whereby the user initially enters their name and desired temperature and flow rate for a shower, for a bath the user enters desired temperature whereupon the tub starts filling until terminated by the user through the control panel. The user's preferences will be stored for future use so that when a user selects a shower or bath the system will retrieve the stored information and provide a shower of similar temperature and flow rate and for a bath of similar temperature and quantity of water. The control panel further provides reporting the quantity of water used in a washing event and may provide historical information related to users and water usage.

Accordingly, the present invention provides connection to a source of hot water and a source of cold water connected to a mixing valve to obtain the desired temperature and a flow meter, restrictor valve and solenoid for controlling flow rate with an accumulator tank to prevent the pipes from rattling when the solenoids open and close. Additionally a solenoid on the hot water source is included for safety in case of failures. Optionally provided for is a pump for recirculating water into the hot water tank until the desired water temperature is reached.

2. Description of the Prior Art

There are other mixing device designed for fluid handling. Typical of these is U.S. Pat. No. 1,153,547 issued to Finney on Sep. 14, 1915.

Another patent was issued to Sparks on May 16, 1916 as U.S. Pat. No. 1,183,599. Yet another U.S. Pat. No. 1,996,330 was issued to Goshaw on Apr. 2, 1935 and still yet another was issued on May 6, 1941 to Gaskill as U.S. Pat. No. 2,241,302.

Another patent was issued to Garrett, et al. on Sep. 29, 1942 as U.S. Pat. No. 2,296,917. Yet another U.S. Pat. No. 2,463,640 was issued to Plett on Mar. 8, 1949. Another was issued to Postmus on Apr. 1, 1958 as U.S. Pat. No. 2,828,766 and still yet another was issued on Apr. 29, 1969 to Renne as U.S. Pat. No. 3,441,212.

Another patent was issued to Lee on Dec. 8, 1987 as U.S. Pat. No. 4,711,393. Yet another U.S. Pat. No. 4,923,116 was issued to Homan on May 8, 1990. Another was issued to Rivera on May 7, 1991 as U.S. Pat. No. 5,012,536 and still yet another was issued on Nov. 9, 1999 to Williams as U.S. Pat. No. 5,979,776.

Another patent was issued to Wack, et al. on Feb. 10, 2004 as U.S. Pat. No. 6,688,530. Yet another U.S. Pat. No. 6,705,534 was issued to Mueller on Mar. 16, 2004. Another was issued to Chandler on May 2, 2006 as U.S. Pat. No. 7,036,535.

Another patent was issued to Hanaoka on Mar. 9, 1985 as Japanese Patent No. JP60044733. Yet another Japanese Patent No. JP60142149 was issued to Fukazawa, et al. on Jul. 27, 1985. Another was issued to Kawamoto on Jan. 25, 1989 as European Patent Application No. EP 0 300 639 and still yet another was issued on Mar. 5, 1990 to Yamabe, et al. as Japanese Patent No. JP2064327.

U.S. Pat. No. 1,153,547

Inventor: James J. Finney

Issued: Sep. 14, 1915

In a thermostatic water device, a mixing chamber provided with inlets for hot and cold water and an outlet for a mixture of the same, a valve in each inlet, a lever provided with connections for the simultaneous opening and closing of said valves, additional valves in each inlet between the first named valves and the mixing chamber, a thermostatic device within the chamber, and connections from the thermostatic device to the last named valves for moving them simultaneously in opposite directions.

U.S. Pat. No. 1,183,599

Inventor: James L. Sparks

Issued: May 16, 1916

In a device of the class described, a casing having an outlet and a pair of inlets, valves controlling said inlets, a valve lever, a shiftable pivot for the support of said valve lever, means whereby said valves are connected to said valve lever in such a way that when said valve lever is turned about said pivot one of said valves moves toward closed position and one moves away from closed position, means whereby said pivot may be shifted and said valve lever turned about its pivot to move said valves from closed to adjusted position.

U.S. Pat. No. 1,996,330

Inventor: Irl R. Goshaw

Issued: Apr. 2, 1935

In a fluid control device for maintaining the temperature of two fluids, varying in temperature and volume, at a substantially constant intermediate temperature, comprising a casing having a plurality of inlets and an outlet, a plurality of valves operative by pressure to control the flow of said fluids from said inlets to said outlet in accordance with changes in pressure of said fluids, and thermostatic means directly connected to said plurality of valves for controlling the operation thereof in accordance with the temperatures of the fluids being mixed.

U.S. Pat. No. 2,241,302

Inventor: Martin T. Gaskill

Issued: May 6, 1941

An automatic temperature regulator for water lines comprising a tank having hot and cold water pipes connected to the bottom of the tank, a discharge pipe leading from the top of tank, valve chambers within the tank communicating with the respective hot and cold water pipes, said chambers being in the form of cylinders, cylindrical valves having a working fit in said cylinders, said valves being open at their bottom and having perforated side walls and closed at their top, rods rising from the top of the valves, a link pivotally mounted intermediate its ends and having its end portions pivoted to each of said rods for oppositely actuating the valves, a thermostat attached at one end to one of said rods, a frame secured to the other end of the thermostat guide means on opposite sides of the frame, a pair of guide rods extending downwardly from the top of the tank with which the guide means are engaged for vertical sliding movement, a rack rising from the top of the frame, a guide for the rack also extending downwardly from the top of the tank and a manually operated pinion engaging the rack for slidably actuating the frame.

U.S. Pat. No. 2,296,917

Inventor: Gervo A. Garrett, et al.

Issued: Sep. 29, 1942

In a water regulating device of the class described, the combination of a casing provided with a base member, hot and cold water inlets connected with said base member at opposite sides of said casing and communicating with the interior of said casing, a cone-shaped hot water valve in connection with one of said inlets, a cone-shaped cold water valve in connection with the other of said inlets, a horizontally disposed mixing plate in said casing above said valves provided with a plurality of orifices through which the hot and cold water passes and is mixed thereby, a rocker arm pivotally mounted above said mixing plate, rods pivotally connected at the opposite ends of said rocker arm with said valve, means for pivotally supporting said rocker arm intermediate its end, and a thermostat pivotally connected with said rocker arm between one end of said rocker arm and its pivotal support.

U.S. Pat. No. 2,463,640

Inventor: Abe Plett

Issued: Mar. 8, 1949

In a thermostatically-controlled water-mixing valve including a housing, a hot water inlet fitting and a cold water inlet fitting in one end of said housing, a mixed water outlet fitting in the opposite end of said housing, a respective valve in each inlet fitting, valve-operating means pivotally mounted on said housing operative to oppositely actuate said valves to control the proportion of hot and cold water admitted to said housing, a thermostat in said housing operatively connected to said valve-operating means, and thermostat-adjusting means extending through one wall of the housing, a plurality of apertured, spaced-apart baffles extending transversely of said housing between said inlet fittings and said thermostat, a guiding partition mounted on the baffle adjacent said thermostat and overlying said thermostat to direct water therearound, and a thermostat-supporting arm pivotally mounted upon said thermostat adjacent baffle and operatively connected with said thermostat-adjusting means.

U.S. Pat. No. 2,828,766

Inventor: John G. Postmus

Issued: Apr. 1, 1958

Liquid-mixing apparatus comprising a housing, two partitions in the upper portion of said housing dividing said upper portion into three side-by-side chambers, a mixing chamber in the housing occupying the entire portion of the below the lower edges of the partitions, in common communication with said three chambers, means in the upper portion of said housing to conduct liquid to two of the three chambers, and means extending partly into the third chamber to draw liquid from said third to said three chambers, said third chamber being located between the other two chambers.

U.S. Pat. No. 3,441,212

Inventor: William C. Renne

Issued: Apr. 29, 1969

A thermostatic mixing valve comprising:

(a) a valve body having inlets respectively for hot and cold water, an outlet for mixed hot and cold water, and a mixing chamber intermediate said inlets and outlet, said valve body having an operating axis and wherein said inlets define valve seats facing inwardly of said valve body at diametrically opposite sides of said axis, said seats being disposed in a plane normal to said axis, (b) a pair of control valves disposed in said body member and operable respectively to control said inlets to regulate the entry of hot and cold water into said valve body, each of said control valves including a closure member engageable in its associated seat and moveable inwardly from said seat into said valve body to open said seat, (c) thermostatically controlled means responsive to the water temperature in said mixing chamber to open either of said control valves wider and to simultaneously throttle the other of said control valves whereby to adjust the proportions between the hot and cold water entering the valve body, said thermostatically controlled means including a cam having a planar operating face disposed obliquely to said axis and effectively engaging said valve closure members, said cam being rotatable about said axis whereby one of said closure members is forced closer to its associated seat by the cam face while the other closure member is allowed to move farther from its associated seat, said thermostatically controlled means also including a thermostat movable responsively to the water mixture temperature in said mixing chamber to rotate said cam, and (d) manually controlled means operable independently of said thermostatically controlled means and operable to open both of said control valves wider simultaneously, or to throttle both of said control valves simultaneously whereby to regulate the total rate of flow of mixed water through said body outlet, said manually operable means being operable to move said cam in a direction parallel to said axis, whereby to move both of said closure members simultaneously closer to or farther from their associated seats.

U.S. Pat. No. 4,711,393

Inventor: Jimmy lee

Issued: Dec. 8, 1987

A water temperature control device wherein the relative inflows of hot and cold water into a mixing chamber and then to an outlet are controlled by a mercury filled temperature sensing element, the volume expansion or contraction of the mercury activating a slave cylinder and connecting linkage to open and close in compensatory fashion the valves allowing increased and decreased water flows from the cold and hot water supplies.

U.S. Pat. No. 4,923,116

Inventor: Gerald L. Homan

Issued: May 8, 1990

A bath water control system in which the bath water is selectively supplied a bath or shower outlets, and the water supply is as to both temperature and period of supply. These parameters may be prestored in a memory along with discrete start times whereby a programmed bath will be automatically available at a discrete time or times in the future. As a means of ensuring that water is not accumulated in the tub prior to water temperature rising to a selected value, the tub drain is closed only after input bath water reaches a selected temperature. Further, means are provided for turning off water in the event that water in excess of a selected value appears. Still further, the temperature of water is indicated both digitally and aurally.

U.S. Pat. No. 5,012,536

Inventor: Antolin Rivera

Issued: May 7, 1991

This economic shower is designed to store and mix water at a desired temperature for use. Primarily, it consists of a reservoir water tank mounted to a wall, and an input pipe is coupled to the tank and to existing hot and cold water control valves. An output pipe is secured to the bottom of the tank and has a shower head attached, and a flexible hose with a valve controlled massage shower head is also attached to the output pipe.

U.S. Pat. No. 5,979,776

Inventor: Roderick A. Williams

Issued: Nov. 9, 1999

A temperature and flow controller for a bath tub or shower is disclosed. The device includes a panel that replaces or surrounds the standard bath tub water valves. Within the panel is a control assembly in communication with temperature sensors in the shower head and the bath tub faucet as well as control valves on the hot and cold water supply lines. The temperature sensors are immediately downstream from a unique, two stage mixing chamber having a rotatable impeller in a first section and a helically grooved inner surface in a second section to thoroughly mix hot and cold water therein. The controller also includes means for enabling water flow at a preset time of day, for a predetermined duration or to deliver a predetermined volume of water.

U.S. Pat. No. 6,688,530

Inventor: Volker Wack, et al.

Issued: Feb. 10, 2004

The invention relates to an electronic mixed water preparation device. Previously such methods could only be implemented in an industrial environment or in combination with additional devices. The inventive mixed water preparation device is a compact flush-mounted unit for electronically controlling mixed water in private households. The compact inventive unit comprises an electronic controller and a step motor which acts upon a mechanical actuator. The preparation of said mixed water can be exclusively carried out in conjunction with a temperature sensor whose measuring values are used to detect through flow and excess temperature, in addition to actual temperature values.

U.S. Pat. No. 6,705,534

Inventor: Craig D. Mueller

Issued: Mar. 16, 2004

A shower control system for facilitating a user's control of the temperature and pressure of water used during a shower. The shower control system includes a shower assembly having a pair of inlet pipes. A first of the inlet pipes is designed for being in fluid communication with a building cold water supply. A second of the inlet pipes is designed for being in fluid communication with a building hot water supply. A stem pipe of the shower assembly is in fluid communication with the inlet pipes. A shower head of the shower assembly is in fluid communication with the stem pipe. A mixing assembly is operationally coupled to the shower assembly. The mixing assembly is designed for controlling pressure and temperature of water sprayed from the shower head. A power assembly is operationally coupled to the mixing assembly for providing power to the mixing assembly.

U.S. Pat. No. 7,036,535

Inventor: Jeffrey Chandler

Issued: May 2, 2006

A method and apparatus allows for control of the temperature and quantity of water added to a mixing bowl during the mixing of batters used for muffins, cakes and the like. A reservoir tank with graduations thereon is provided with appropriate water lines for filling the reservoir tank with a desired amount of measured and tempered water. A temperature measuring device is used for measuring the temperature of the water in the reservoir tank. Appropriate valving connected to the reservoir tank permits dispensing of the water at a controlled rate into (1) the mixing bowl, (2) a bypass line if the operator desires to rinse residual ingredients (eggs, oil, molasses etc.) from smaller measuring containers and pour them into the mixing bowl or (3) a waste line. An overflow port system is provided on the reservoir tank to prevent overfilling thereof.

Japanese Patent Number JP60044733

Inventor: Tadashi Hanaoka, et al.

Published: Mar. 9, 1985

PURPOSE: To miniaturize a hot water storage tank by a method wherein the hot water heated in the hot water storage tank is supplied successively in a bathtub in installments so as to use the bathtub as a heat storage tank. CONSTITUTION: When a heat pump unit 2 is put into running, the highly pressurized refrigerant by being compressed by a compressor 21 is liquefied at a heat exchanger 22 housed at the bottom in a hot water storage tank 1 and at that time its heat of condensation is given to the surrounding water in order to raise the water temperature. When the temperature of hot water in the upper portion of the hot water storage tank 1 reaches the predetermined primary temperature such as 45 deg. C. as the result of temperature rise as mentioned above, the temperature is detected by a temperature sensor 70, which changes over a switching valve 52 to a hot water delivery circuit 71 side and at the same time puts a circulating pump 51 into actuation. As a result, the hot water in the upper portion of the hot water storage tank 1 is delivered through the switching valve 52 and a mixing valve 72 from a faucet 73 into a bathtub 61. In such a manner as just mentioned above, the water heated in the hot water storage tank 1 is successively supplied in the bathtub 61 until the amount of the hot water in the bathtub 61 reaches the predetermined amount. After that, the hot water in the upper portion of the hot water storage tank 1 is raised its temperature for heat storage further high up to a temperature such as 75-80 deg. C. for the usage of another hot water supply or shower.

Japanese Patent Number JP60142149

Inventor: Tomoaki Fukazawa, et al.

Issued: Jul. 27, 1985

PURPOSE: To reduce the volume of a hot-water reserving tank as well as the space for installation of the same by a method wherein hot-water is supplied automatically through a mixing cock whenever the temperature of the hot-water reserved in the tank is risen to a requested temperature. CONSTITUTION: When the lower tank sensor 5 of a tank 1 has detected the temperature of 65 deg. C., for example, the operation of a heat pump 2 is stopped and an automatic opening and closing valve 11 is opened, whereby the hot-water in the tank 1 is mixed with water from a city water pipe 6 and is supplied into a bathtub 17 through a hot-water supply port 14. At the same time, cold water from the city water pipe 6 flows into the tank 1 and when the hot-water temperature in the tank 1 becomes lower than 65 deg. C., an upper sensor 9 detects the temperature, the automatic opening and closing valve 11 is closed and the hot-water supply of first time is finished. Here, the heat pump 2 starts the operation thereof again from the time when the temperature has been reduced lower than 65 deg. C. Thereafter, above-described motions are repeated until a water level sensor 15 detects the signal of ON. Thus, the capacity of the tank 1 is enough to suffice a volume consumed in washstand, shower, toilet, kitchen or the like and it may be miniaturized.

European Patent Application Number EP 0 300 639

Inventor: Ryuichi Kawamoto, et al

Published: Jan. 25, 1989

Water and hot water from a water storage tank (10) and a hot water storage tank (11), respectively, are mixed in a mixing valve (5), are pressured up by a pump (2), and outflow from a shower head (1). The motor (6) for the mixing valve (5) and the pump (2) are driven so that a signal is output from the controller (20) to the regulator (7) of the motor (6) for altering the mixing ratio of hot water to water in the mixing valve (5) and the regulator (3) of the pump (2) thereby to obtain objective water temperature and water pressure.

Japanese Patent Number JP 2064327

Inventor: Katsuyuki Yamabe, et al.

Published: Mar. 5, 1990

PURPOSE: To feed hot water under a high pressure to a plug and improve a feeling of use such as a shower and the like by a method wherein a pressurizing means for pressurizing hot water supplied from a hot water unit to the plug unit is provided. CONSTITUTION: A hot water feeding pipe 18 is connected to a mixing water plug 22 through a pressurizing pump 17. It is connected to a controller 23 and it is controlled by a controller 23. A hot water tank 14 and the pressurizing pump 17 may constitute a pressurizing means. The pressurizing pump 17 is controlled in response to an output signal from a door switch 31 or an operating switch 30. It is operated in case that a person is present in a bath room or an operating switch 30 for preparing a use of shower, the hot water within the hot water tank 14 is pressurized and discharged. That is, the hot water heated by an electrical hot water heater 11 is stored within the hot water tank 14, thereafter the water is pressurized by the pressurizing pump 17 and supplied to the shower 29, resulting in that a better feeling of use can be attained even in case of the shower 29 in which a relative high pressure such as a massage shower and the like is required.

While these mixing devices may be suitable for the purposes for which they were designed, they would not be as suitable for the purposes of the present invention, as hereinafter described.

SUMMARY OF THE PRESENT INVENTION

The all in one automated water management system of the present invention has several distinct advantages over conventional water usage having manual controls by eliminating the manual controls. Parameters for a user bathing event are initialized by the user entering a user ID selecting a desired water temperature, type of bathing event and parameters for the event, such parameters would include bath parameters and shower parameters. Once stored the parameters can be recalled as desired thereby providing consistent user desired result for a bath and shower. The touch screen LCD, or push button unit will be able to control user desired temperature and flow rate while at the same time reporting time duration of hot water remaining in the system and typical parameters in a washing event including current time and date, time duration of shower, when applicable, and amount of water used.

In operation the user presses the start button to initiate the system whereupon the mixing valve is opened to full hot and water channeled directly into a drain, unless the optional return pump is used which will pump the water back into the hot source water system, until the hot water temperature reaches the desired user temperature. Once reached, the bypass will close and the mixer valve will begin to add cold water to maintain a constant temperature. The system further provides an accumulator tank to absorb line pressure differential as the solenoids open and close which results in quiet operation as opposed to the pipes rattling during solenoid actuation. If a bath event is selected the tub will fill with the desired amount of water at the desired temperature based on the user's historical preference. The system also provides that an optional temperature sensor within the tub can determine the water is too cold, based on user preference, and at that point the hot water will begin to flow into the tub.

The system also provides a transformer rectifier with a battery backup that will supply the unit with low voltage power for safety and in the event of a power outage, the battery will enable the user to finish the bathing event.

A primary object of the present invention is to provide an automated water management system for a shower and/or bath.

Another object of the present invention is to provide an automated water management system having a control panel whereby a user can initiate a shower or bath.

Yet another object of the present invention is to provide an automated water management system that for a shower records a user=s preference for flow rate and desired temperature and for a bath the desired temperature and quantity of water so that a user simply selects what type of washing event, shower or bath, whereupon the system retrieves the user=s stored preferences and initiates water flow, shower or bath, according to the stored preferences.

Yet another object of the present invention is to provide a water management system having temperature sensors on hot and cold water sources Still yet another object of the present invention is to provide a control unit for said controlled temperature mixing.

Another object of the present invention is to provide said control unit with a touch screen or push button for setting and varying the system parameters.

Additional objects of the present invention will appear as the description proceeds.

The present invention overcomes the shortcomings of the prior art by providing an automated water control system for a shower or bath that provides means for automated controls that give the user management of both water temperature and water consumption.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
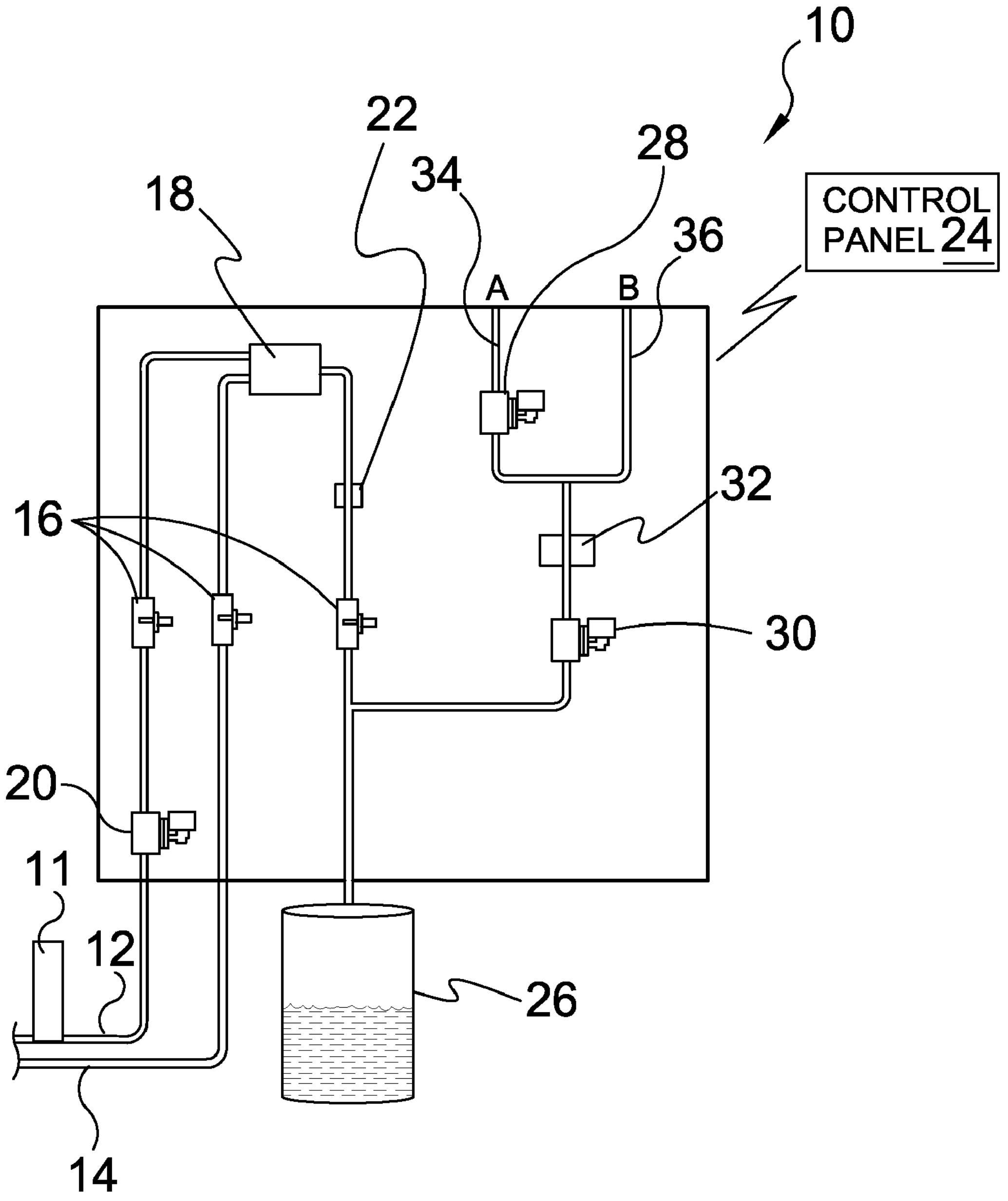
FIG. 1 is a diagrammatic view of the present invention.

Turning now descriptively to the drawings, in which similar reference characters denote similar elements throughout the several views, the figures illustrate the Water Management System for Showers and Baths of the present invention. With regard to the reference numerals used, the following numbering is used throughout the various drawing figures.

10 Water Management System for Showers and Baths of the present invention
11 hot water heater
12 hot water source
14 cold water source
16 temperature sensor
18 mixer valve
19 mixed water line
20 hot water solenoid
22 flow meter sensor
24 control panel
26 accumulator tank
28 outlet 'A' solenoid
30 shutoff solenoid
32 restrictor valve
34 outlet 'A'
36 outlet 'B'
38 bathtub
40 shower
42 water
44 drain
46 shower head
48 return pump
50 return pump outlet 'C'
52 return pump solenoid
54 advantages of automated water control
56 water temperature management features
58 water consumption management features
60 central processing unit (CPU) module
62 touch screen display and user controls
64 bath water volume, memory control and temperature

DETAILED DESCRIPTION OF THE PREFERRED EMBODIMENT

The following discussion describes in detail one embodiment of the invention. This discussion should not be construed, however, as limiting the invention to those particular embodiments; practitioners skilled in the art will recognize numerous other embodiments as well. For definition of the complete scope of the invention, the reader is directed to appended claims.

FIG. 1 is a diagrammatic view of the present invention 10. As illustrated, the system 10 starts with a source of hot water 12 from hot water heater 11 and a source of cold water 14 with each having a temperature sensor 16 installed prior to connection to a mixing valve 18 with a hot water solenoid 20 to stop the flow of hot water to the mixing valve 18 in the event of a malfunction and prevents water to travel between the hot and cold water lines when the unit is off. A temperature sensor 16 which works in conjunction with the mixing valve 18 to maintain a desired temperature in the mixed water line 19. The flow regulation and temperature are user preference indicated by the user through the control panel 24. The system further provides an accumulator tank 26 to absorb line pressure differential as the solenoids open and close which results in quiet operation as opposed to the pipes rattling during solenoid actuation. A restrictor valve 32 is provided to control water flow to outlets AA@ 34 and AB@ 36. The two other solenoids 28,30 are shown for completeness of the generic components and are applicable to specific system configurations shown in the accompanying figures.

Figure 2:
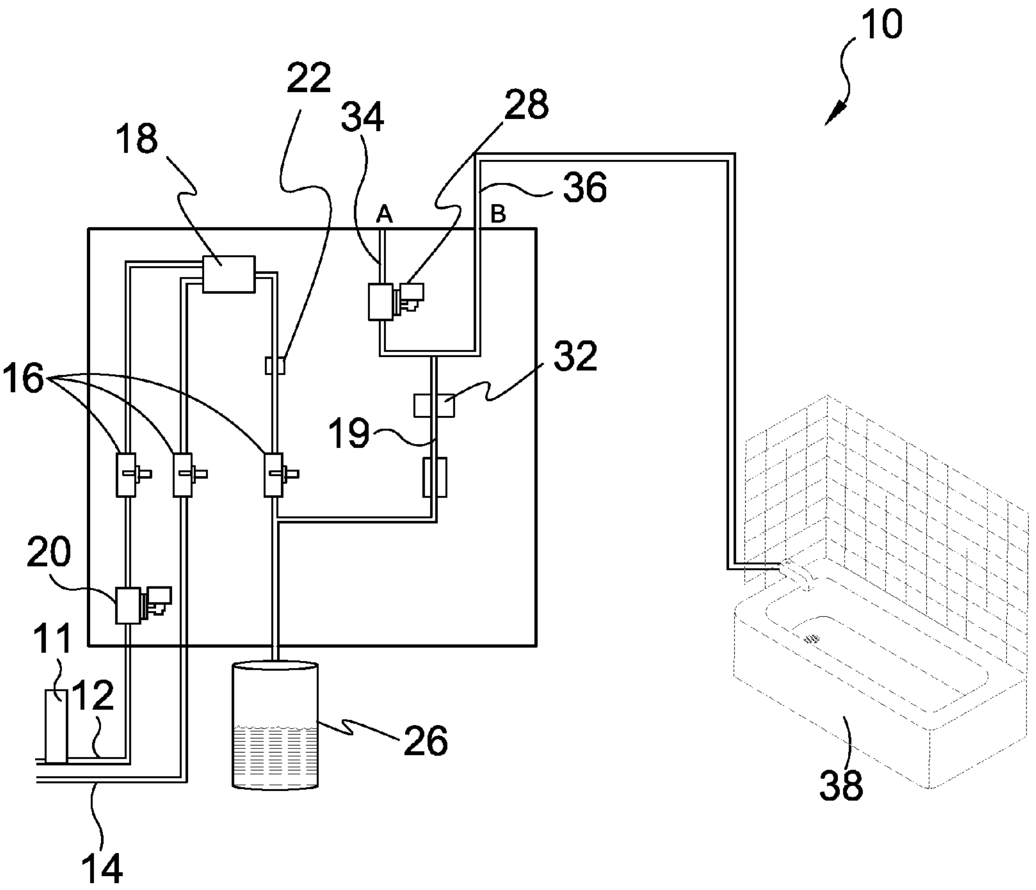
FIG. 2 is a diagrammatic view of the present invention for a bath only.

FIG. 2 is a diagrammatic view of the present invention 10 for a bathtub 38 only. As aforementioned, the system starts with a source of hot water 12 from hot water heater 11 and a source of cold 14 with each having a temperature sensor 16 installed prior to connection to a mixer valve 18 with a hot water solenoid 20. A flow restrictor valve 32 controls flow rate with a flow meter sensor 22. A temperature sensor 16 which works in conjunction with the aforementioned mixer valve 18 to maintain a desired temperature. The flow regulation and temperature are user preference indicated by the user through the control panel 24. The system further provides an accumulator tank 26 to absorb line pressure differential as the solenoids open and close which results in quiet operation as opposed to the pipes rattling during solenoid actuation. The generic system provides for two outlets labeled 'A' 34 and 'B' 36 which for a bath only uses outlet 'B' 36 for the bathtub while outlet 'A'34 is not used and may be eliminated from the system or use the solenoid 28 on the 'A' 34 side to terminate flow through the 'A' 34 branch. This is strictly a design consideration whether to allow for a future shower installment.

Figure 3:
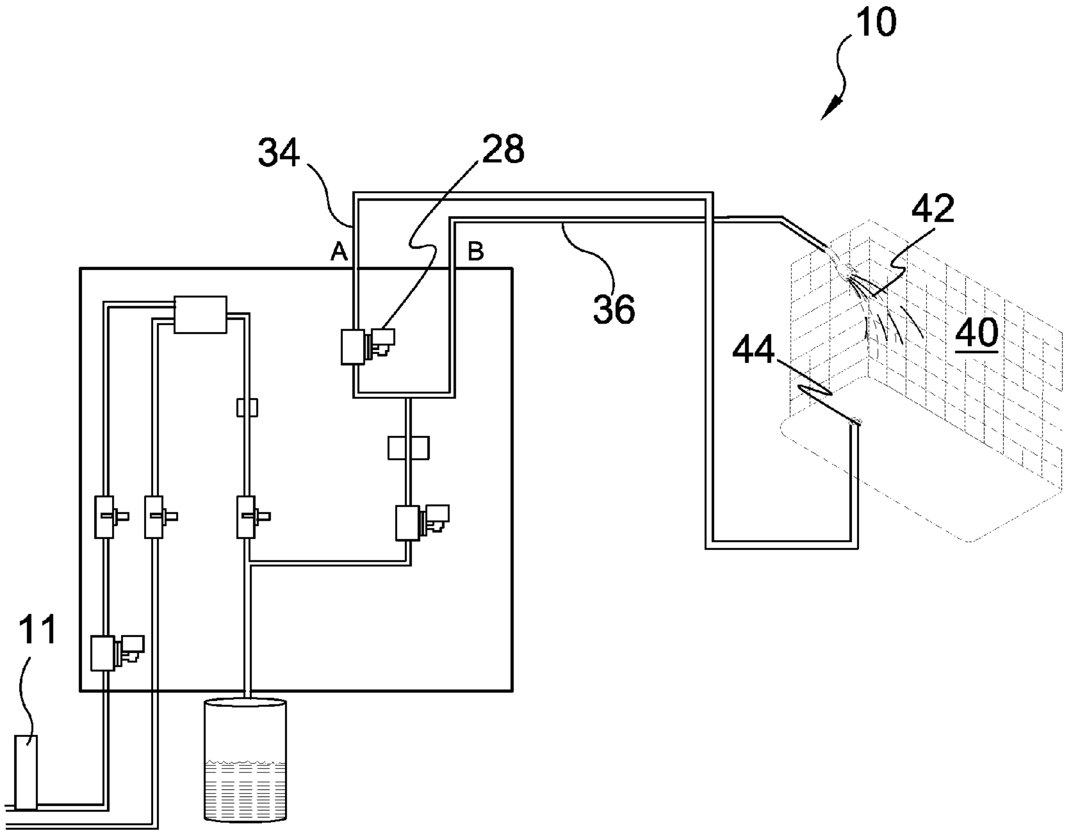
FIG. 3 is a diagrammatic view of the present invention for a shower only.

FIG. 3 is a diagrammatic view of the present invention 10 for a shower 40 only. Shown is a system for a shower 40 only wherein outlet 'A'34 is used to channel the water 42 into a drain 44 until the water temperature reaches the user desired temperature whereupon solenoid 'A'28 closes causing water flow to the shower 40 via outlet 'B' 36.

Figure 4:
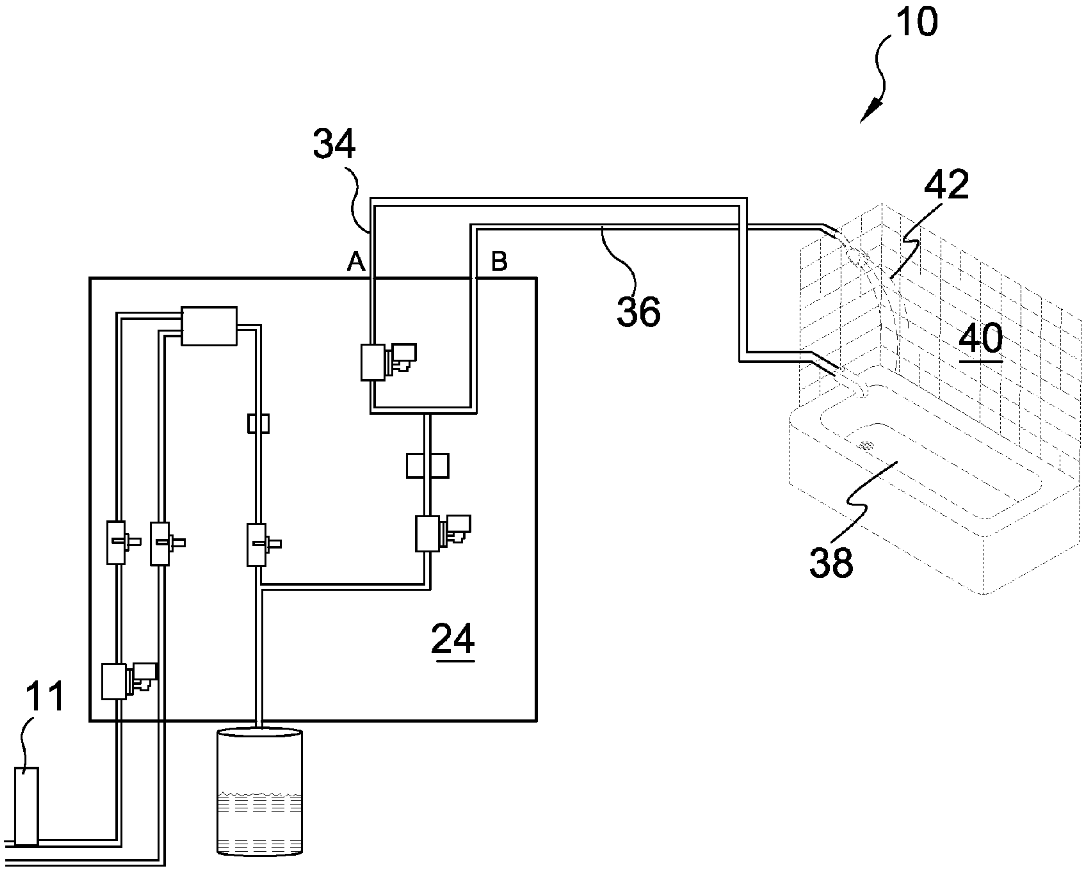
FIG. 4 is a diagrammatic view of the present invention for a bathtub and shower.

FIG. 4 is a diagrammatic view of the present invention 10 for a bathtub 38 and shower 40. Shown is a system for a bath 38 and shower 40 wherein outlet 'A' 34 is channeled to the bathtub and outlet 'B'36 terminates at the shower head 46. It is provided as a design consideration whether the system channels the water 42 to the bathtub 38 when shower 40 is selected from the control panel 24 until the water 42 reaches the user desired temperature.

Figure 5:
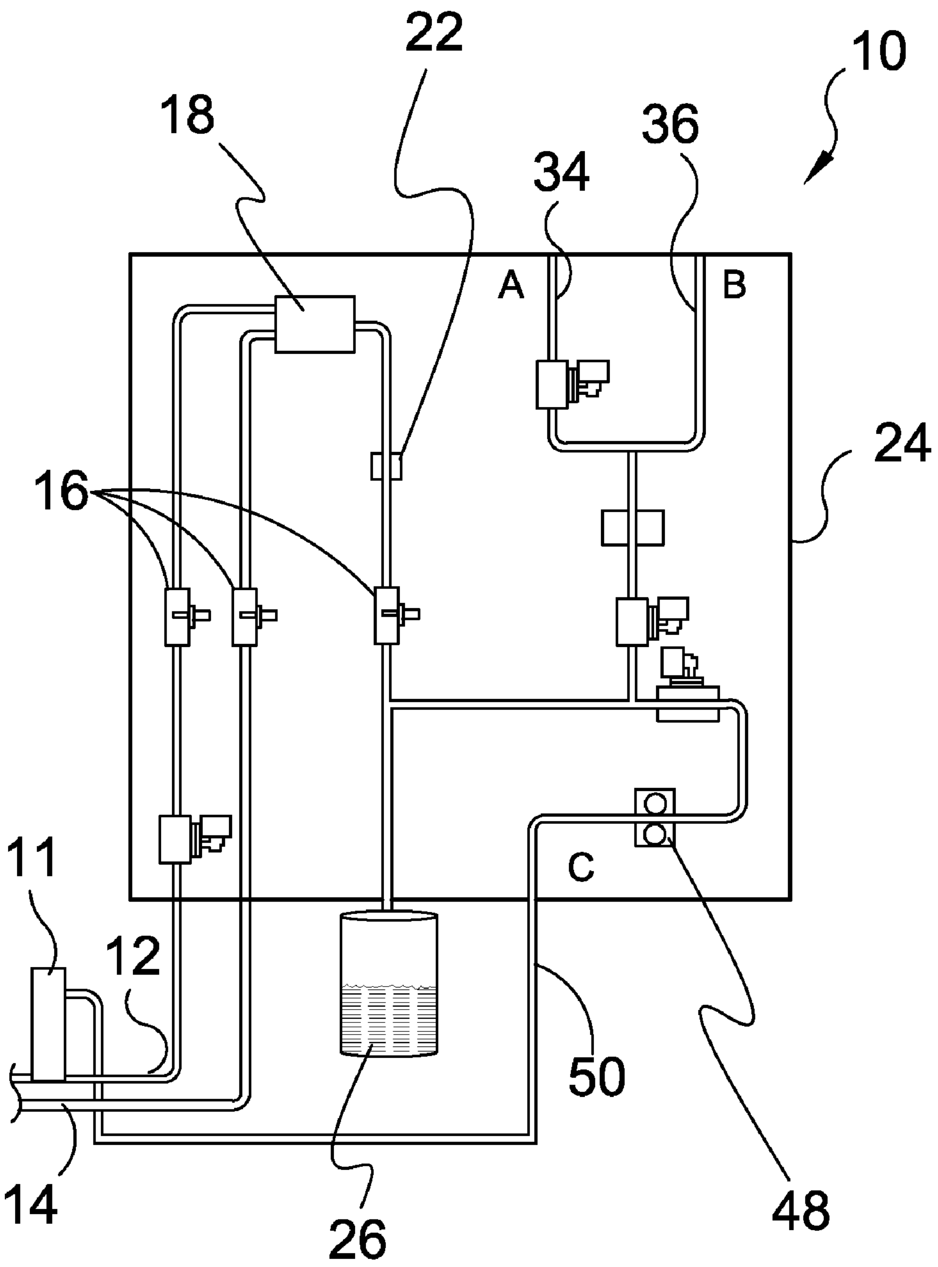
FIG. 5 is a diagrammatic view of the present invention incorporating a return pump.

FIG. 5 is a diagrammatic view of the present invention 10 incorporating a return pump 48. As aforementioned, the system starts with a source of hot water 12 from hot water heater 11 and a source of cold 14 with each having a temperature sensor 16 installed prior to connection to a mixer valve 18 with a hot water solenoid 20. A temperature sensor 16 which works in conjunction with the aforementioned mixer valve 18 to maintain a desired temperature. The flow regulation and temperature are user preference indicated by the user through the control panel 24. The accumulator tank 26 shown holds air and water to cushion the system from pressure fluctuations. With the inclusion of a return pump 48, the generic system provides for three outlets labeled 'A' 34, 'B' 36, and 'C' 50 wherein 'C' 50 is an outlet for a return pump 48 for recycling water back to the hot water source during system startup until the user parameters of temperature are met.

Figure 6:
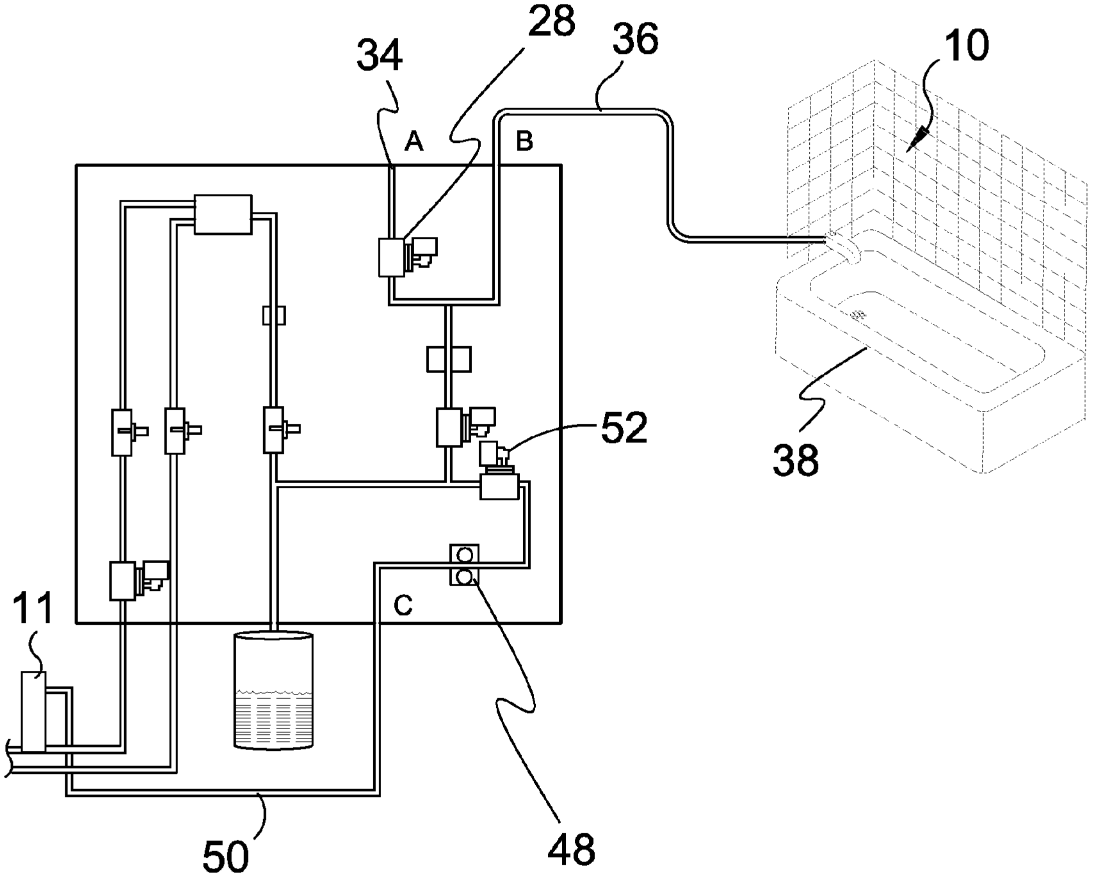
FIG. 6 is a diagrammatic view of the present invention incorporating a return pump for a bathtub only configuration.

FIG. 6 is a diagrammatic view of the present invention 10 incorporating a return pump 48 for a bathtub 38 only configuration. The generic system provides with the inclusion of a return pump 48 for three outlets labeled 'A' 34, 'B' 36 and 'C' 50 which for a bath only uses outlet 'B'36 for the bathtub 38 while outlet 'A' 34 is not used and may be eliminated from the system or use the solenoid 28 on the 'A' 34 side to terminate flow through the 'A'34 branch. Regarding outlet 'C' 50, the water management system of the present invention 10 provides for a solenoid 52 and return pump 48 so that when the user initiates a washing event the water will recirculate back into the hot water heater 11 until the temperature reaches the desired user preference.

Figure 7:
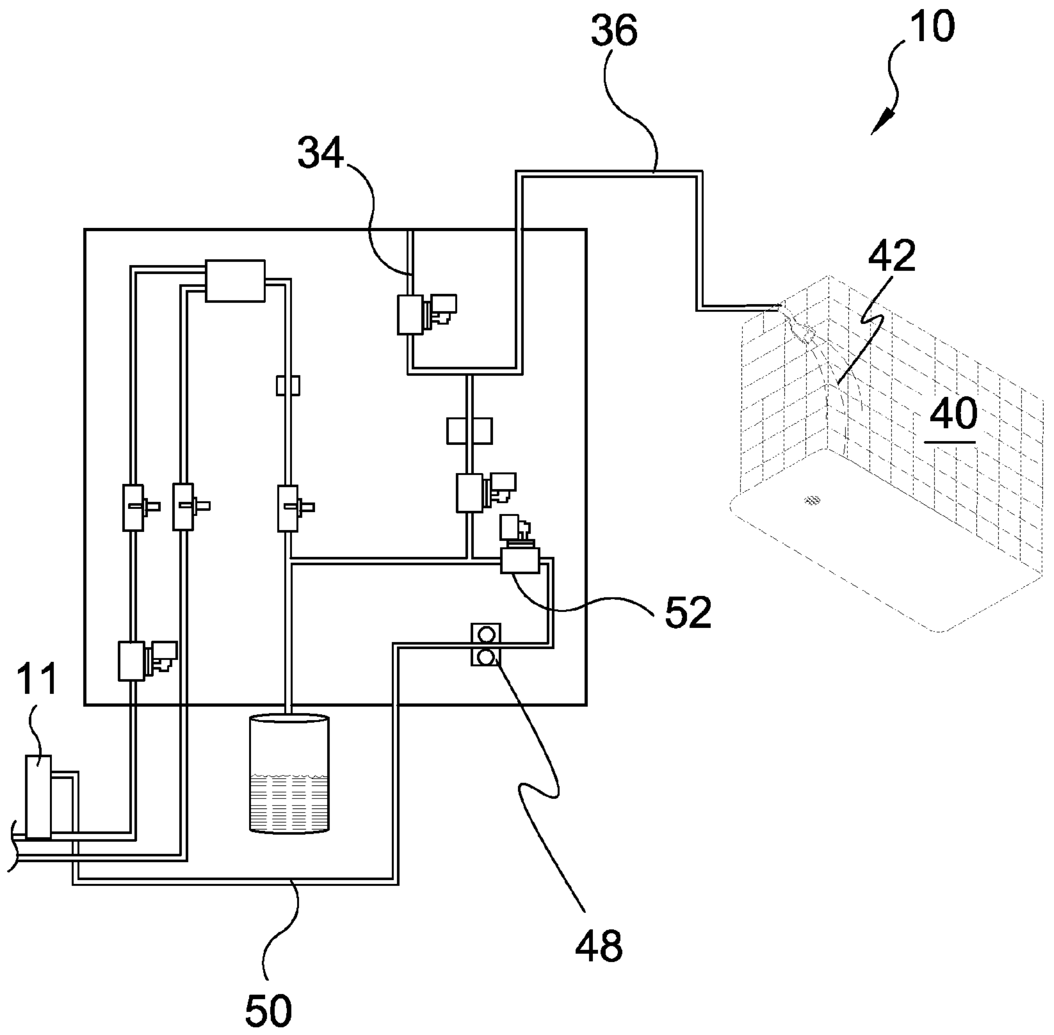
FIG. 7 is a diagrammatic view of the present invention incorporating a return pump for a shower only configuration.

FIG. 7 is a diagrammatic view of the present invention 10 incorporating a return pump 48 for a shower 40 only configuration. The generic system provides a return pump 48 for three outlets labeled 'A'34, 'B' 36 and 'C' 50 which for a shower 40 only uses outlet 'B' 36 while outlet 'A' 34 is not used. Outlet 'C' 50 provides for a solenoid 52 and return pump 48 so that when the user initiates a washing event the water 42 will recirculate back into the hot water heater 11 until the temperature reaches the desired user preference.

Figure 8:
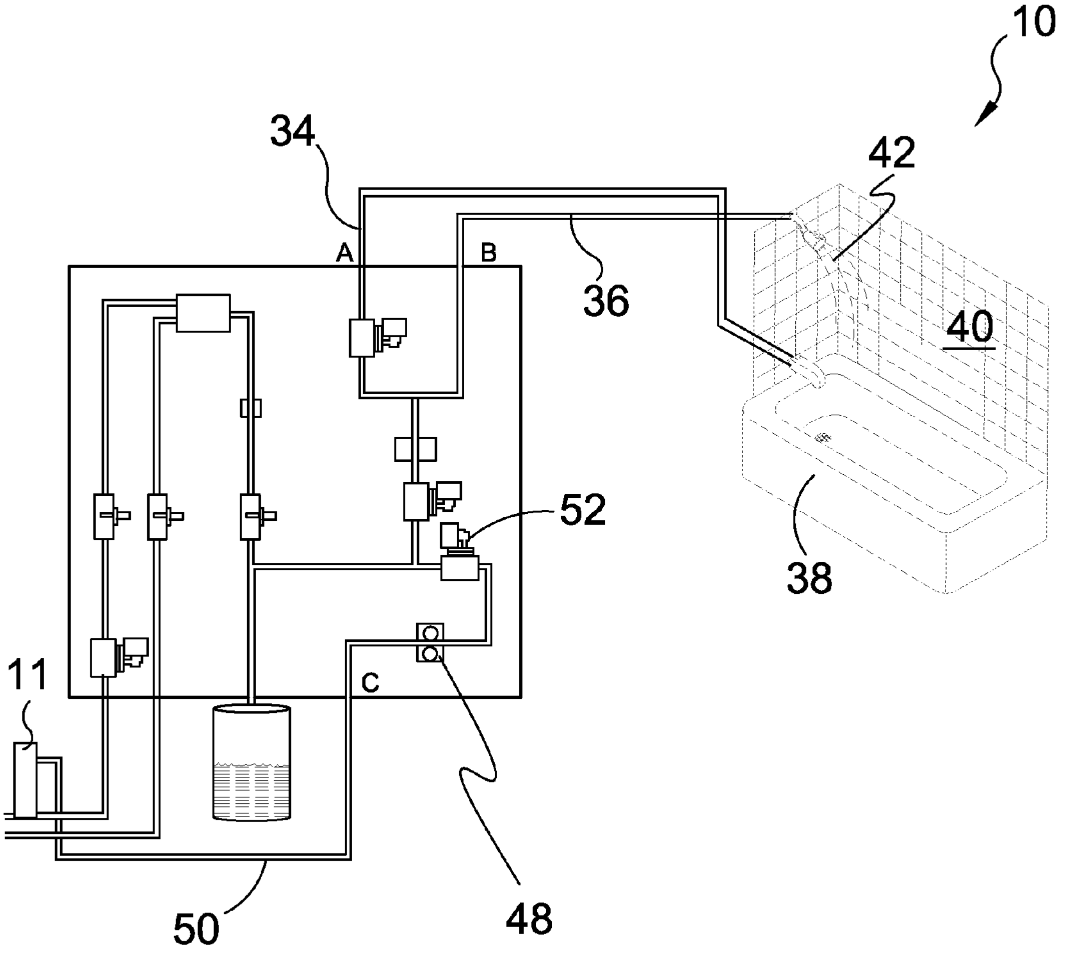
FIG. 8 is a diagrammatic view of the present invention incorporating a return pump for a bathtub and shower configuration.

FIG. 8 is a diagrammatic view of the present invention 10 incorporating a return pump 48 for a bathtub 38 and shower 40 configuration. The generic system provides with the inclusion of a return pump 48 for three outlets labeled 'A' 34, 'B' 36 and 'C' 50 which for a bathtub 38 and shower 40 uses outlet 'B' 36 for the shower 40 and outlet 'A' 34 for the bathtub 38. Outlet 'C' 50 provides for a solenoid 52 and return pump 48 so that when the user initiates a washing event the water 42 will recirculate back into the source until the temperature reaches the desired user preference.

Figure 9:
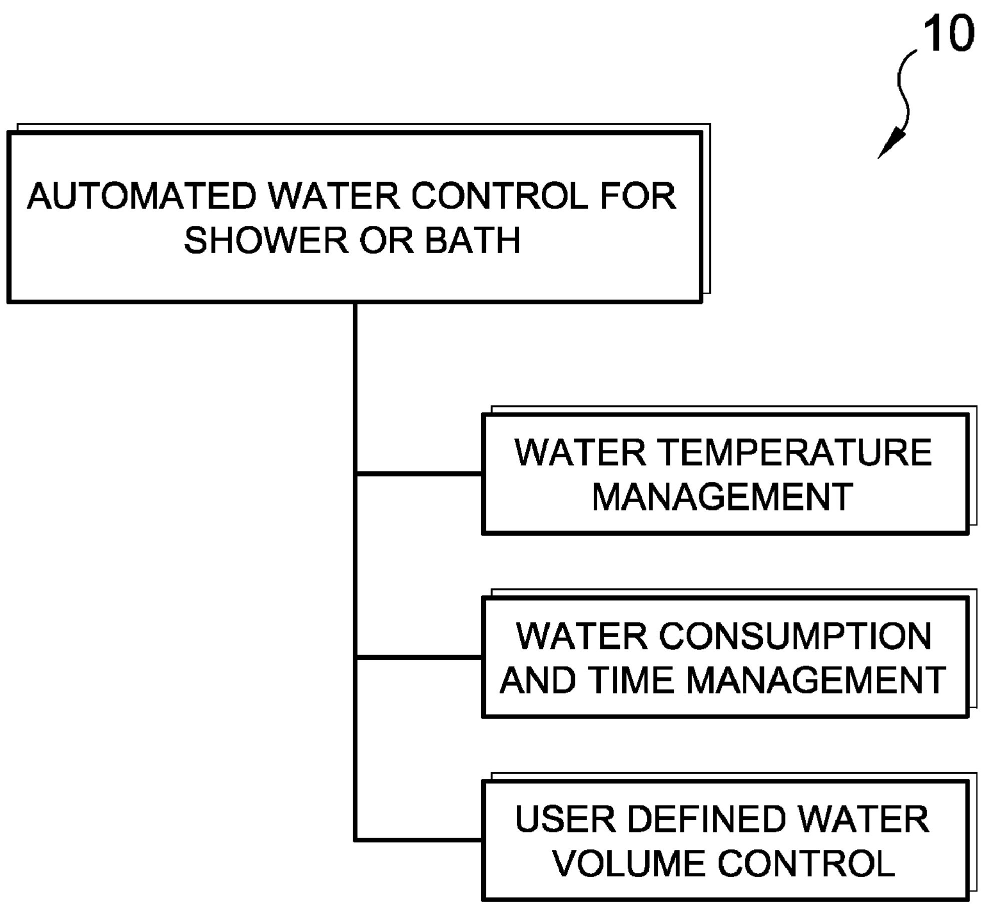
FIG. 9 is a block diagram of the present invention's automated water control system for a shower or bath.

FIG. 9 is a block diagram of the present invention's 10 automated water control system for a shower or bath. Shown is a diagram depicting the order of operations performed by the various components and elements comprising the present invention's automated water control system for a shower or bath providing means for automated controls that give the user management of water temperature and water consumption.

Figure 10:
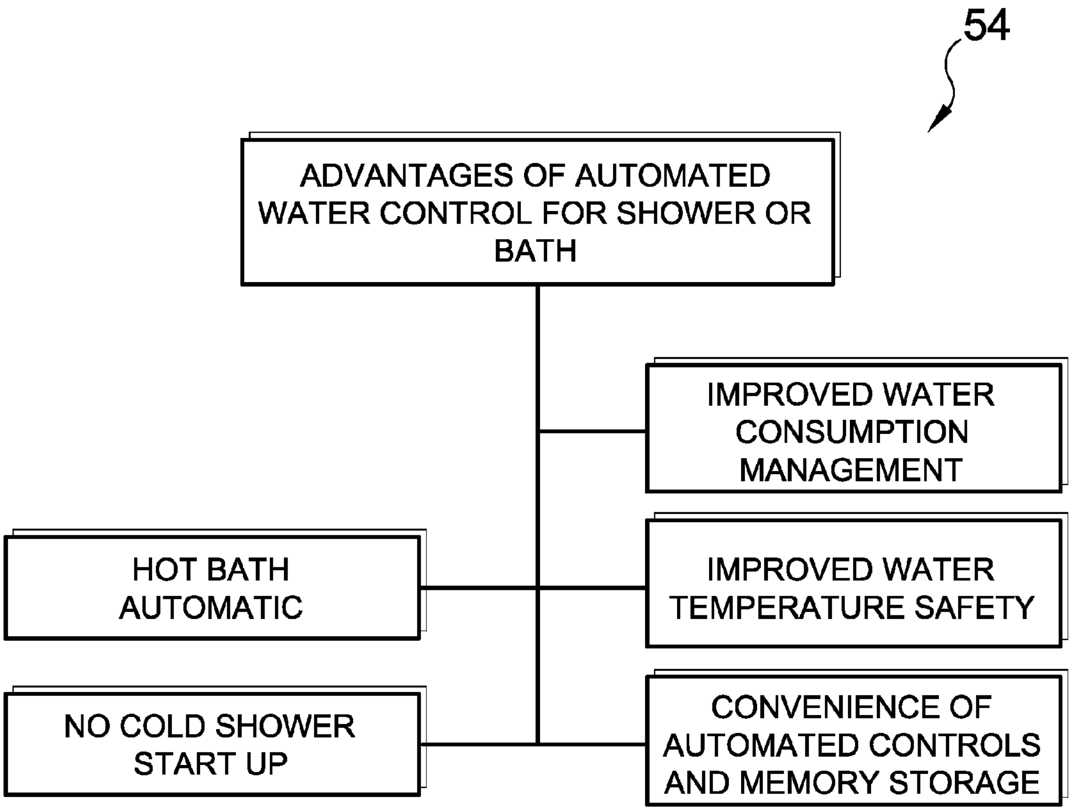
FIG. 10 is a block diagram of the advantages of the present invention's automated water control system.

FIG. 10 is a block diagram of the advantages of the present invention's automated water control system 54. The present invention's automated water control system for a shower or bath provides unique advantages over existing systems. Such advantages include control and management of water consumption, control over water temperature allowing for improved safety, and the convenience of automated controls and memory storage.

Figure 11:
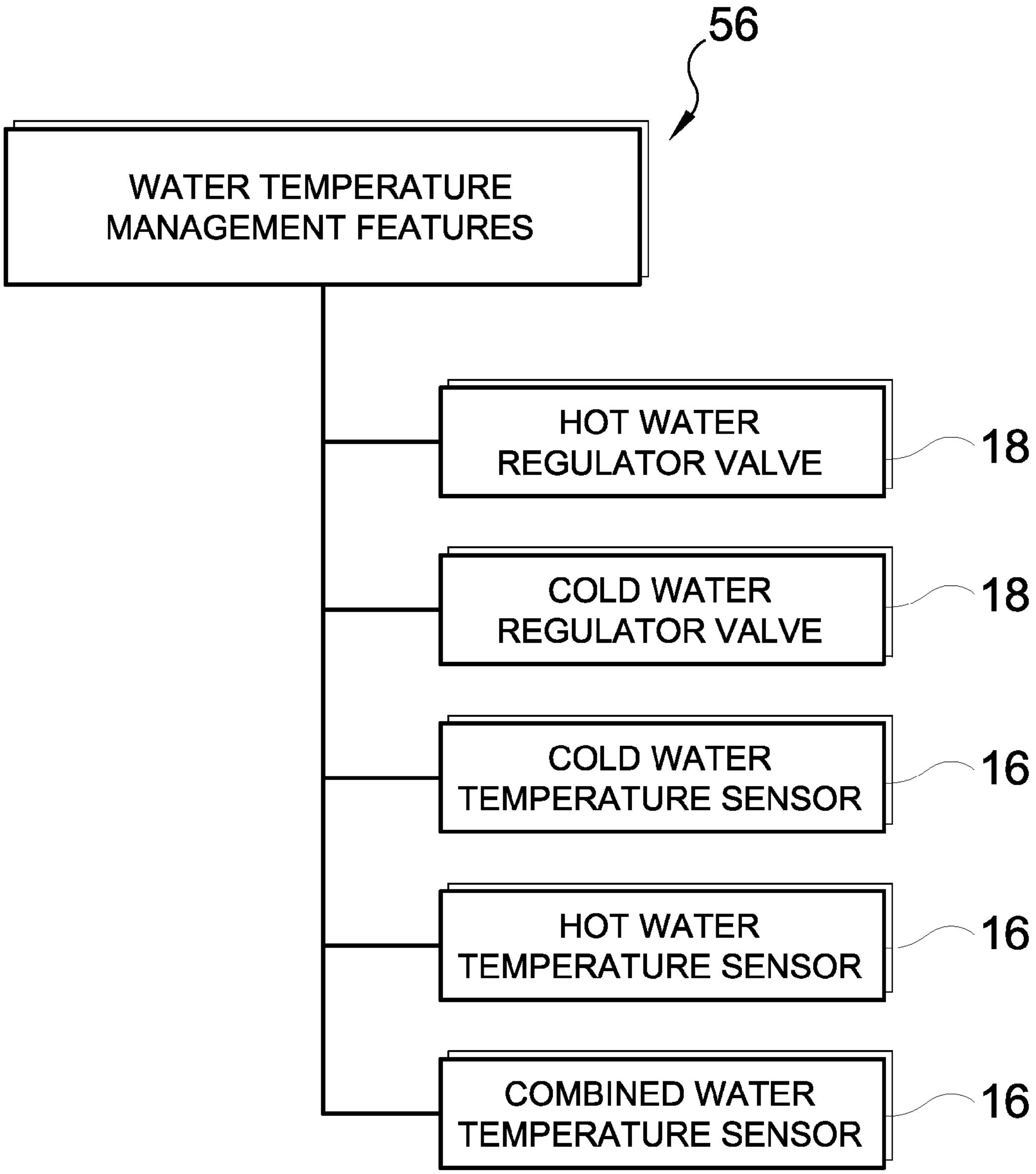
FIG. 11 is a block diagram of the present invention's water temperature management features.

FIG. 11 is a block diagram of the present invention's water temperature management features 56. Shown is a diagram depicting the order of operations performed by the various components and elements comprising the present invention's automated water control system for a shower or bath providing means for automated controls 16,18 that give the user management of both water temperature and water consumption.

Figure 12:
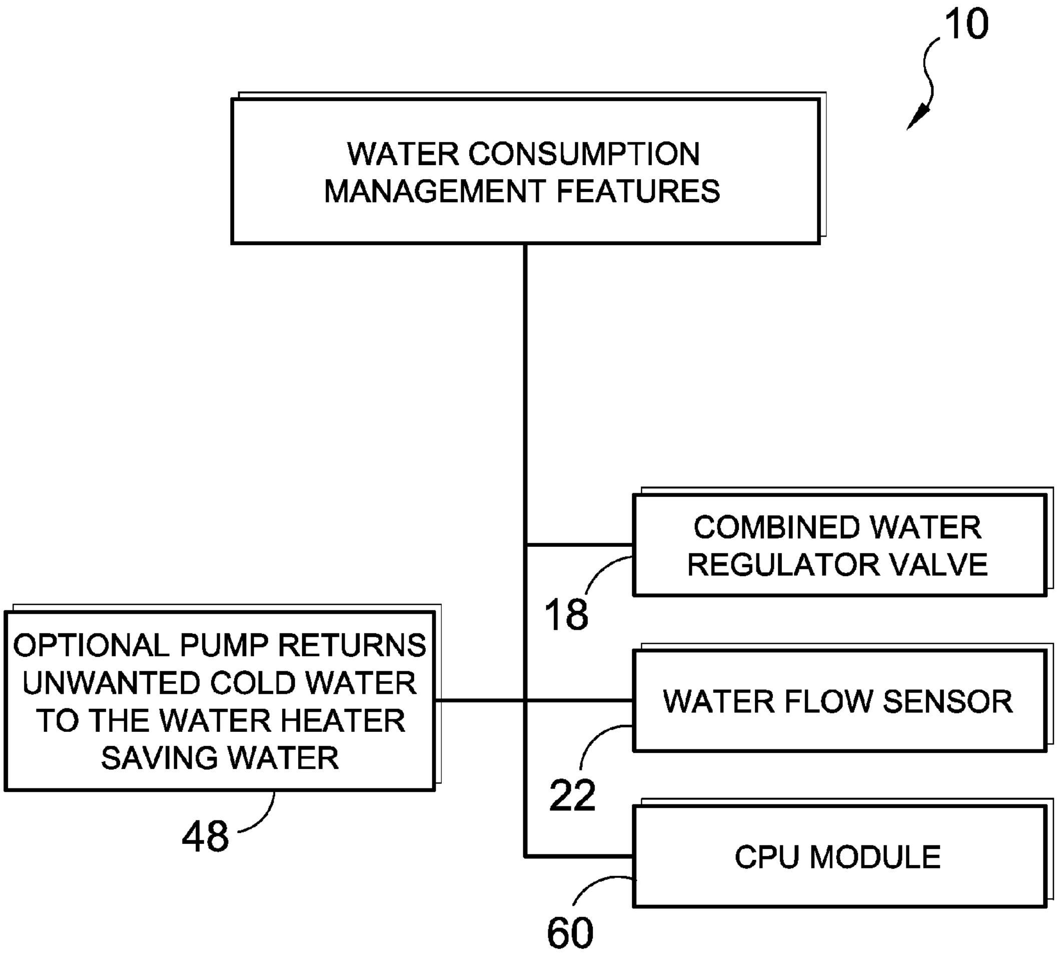
FIG. 12 is a block diagram of the present invention's water consumption management features.

FIG. 12 is a block diagram of the present invention's water consumption management features 58. Shown is a diagram depicting the order of operations and relating operations performed by the various components and elements comprising the present invention's automated water control system for a shower or bath providing means for automated controls that give the user management of both water temperature and water consumption. Shown is the mixing valve 18, the flow meter sensor 22, the CPU module 60 and the optional return pump 48.

Figure 13:
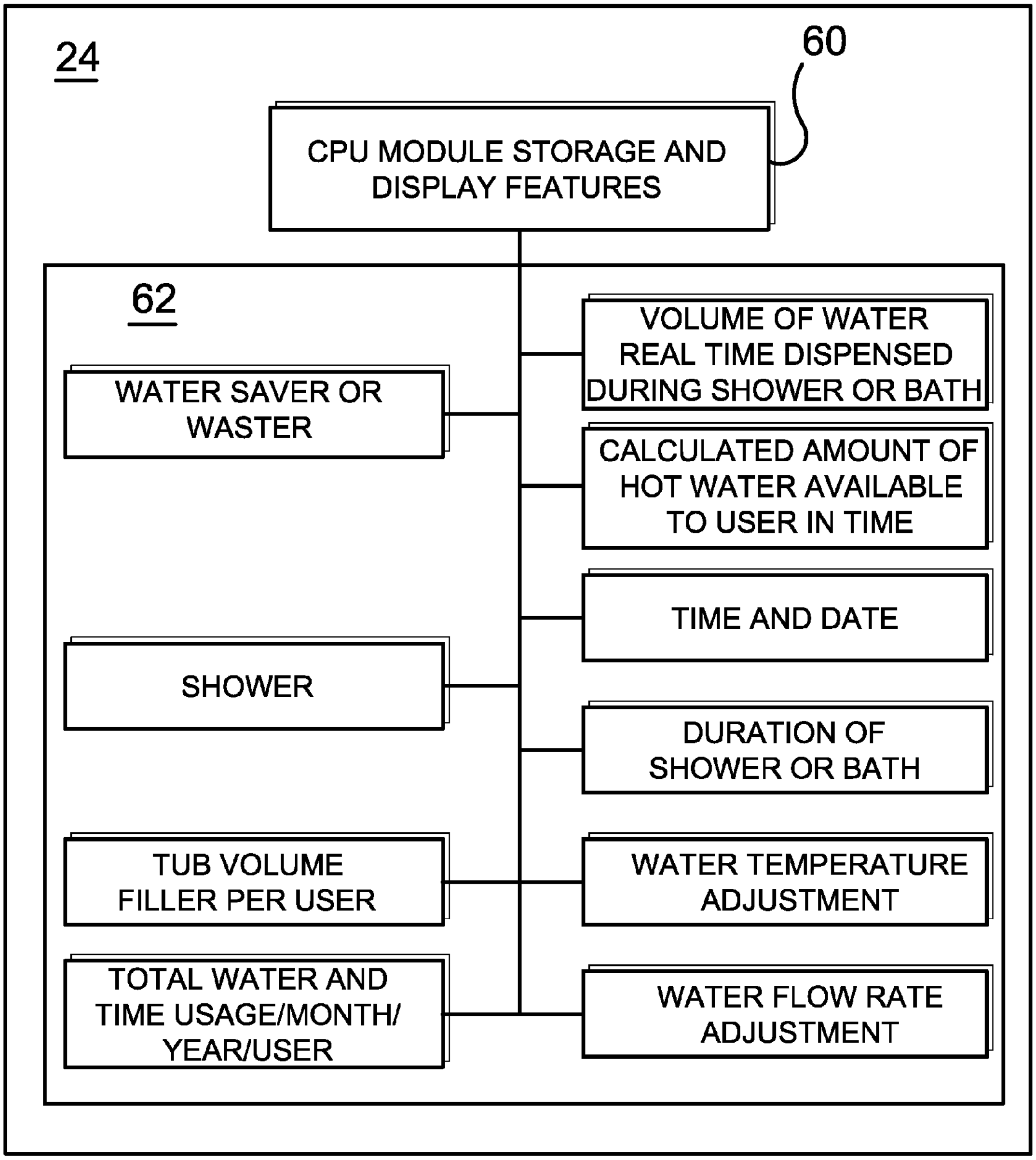
FIG. 13 is a block diagram of the present invention's CPU module display and control features.

FIG. 13 is a block diagram of the present invention's CPU module 60 display and control features. The present invention's automated water control system for a shower or bath utilizes a CPU module 60 for user control and display of data 62 on the control panel 24. A touch screen LCD displays and user controls 62 allows the user to define and/or read the volume of water dispensed, the desired temperature of the water, the time elapsed during a shower or bath, the time and date of shower or bath, the flow rate of the water, and a calculation of the remaining hot water available to the user.

Figure 14:
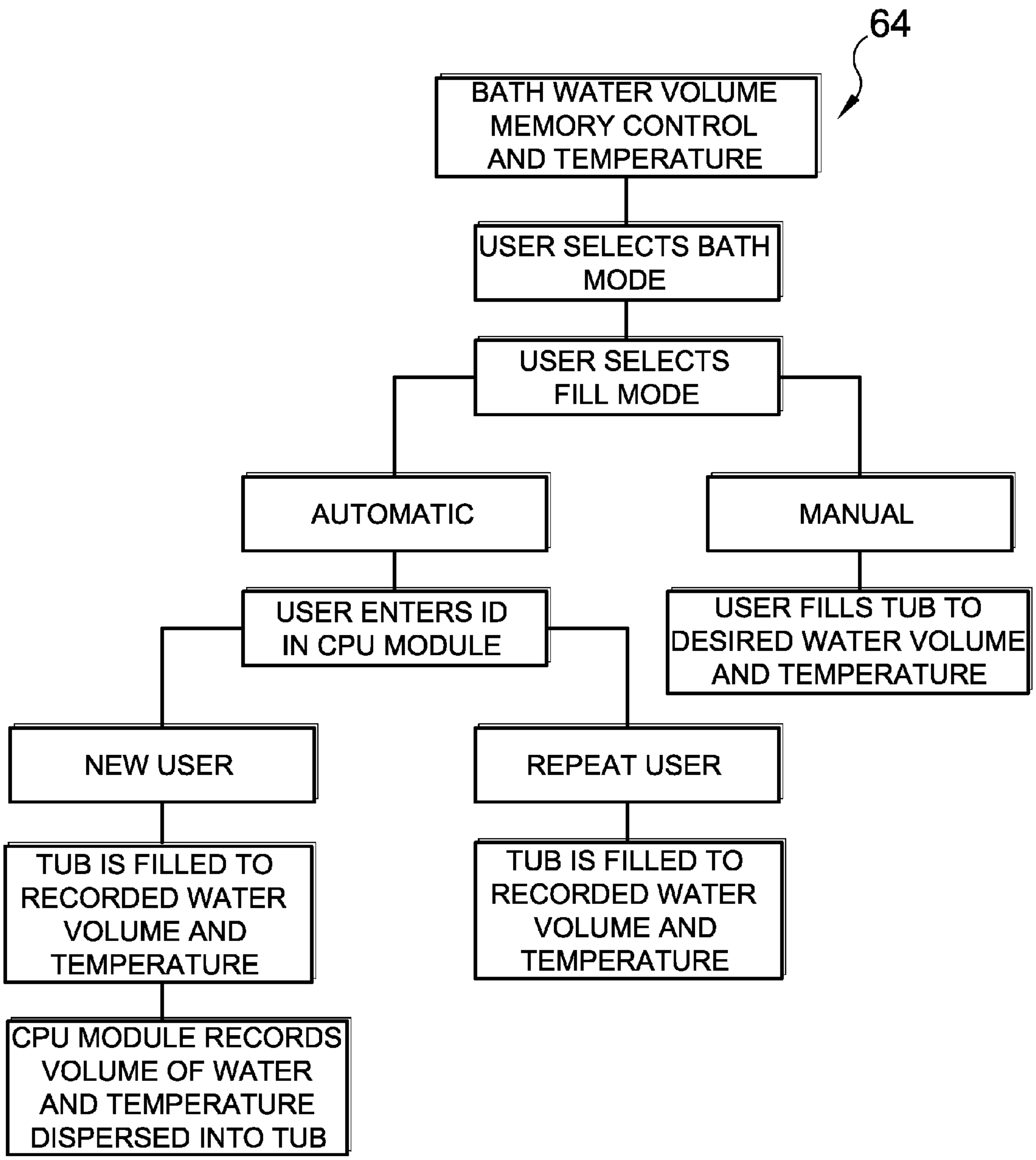
FIG. 14 is a flow chart of the present invention's bath water volume control and memory feature.

FIG. 14 is a flow chart of the present invention's bath water volume control and memory feature 64. The present invention's automated water control system for a shower or bath provides means for automated control of water volume. Once a user defines the amount of water to be dispensed for a bath, the volume for that user is stored in the CPU module, the volume of water is then dispensed for the same amount for future baths.

Figure 15:
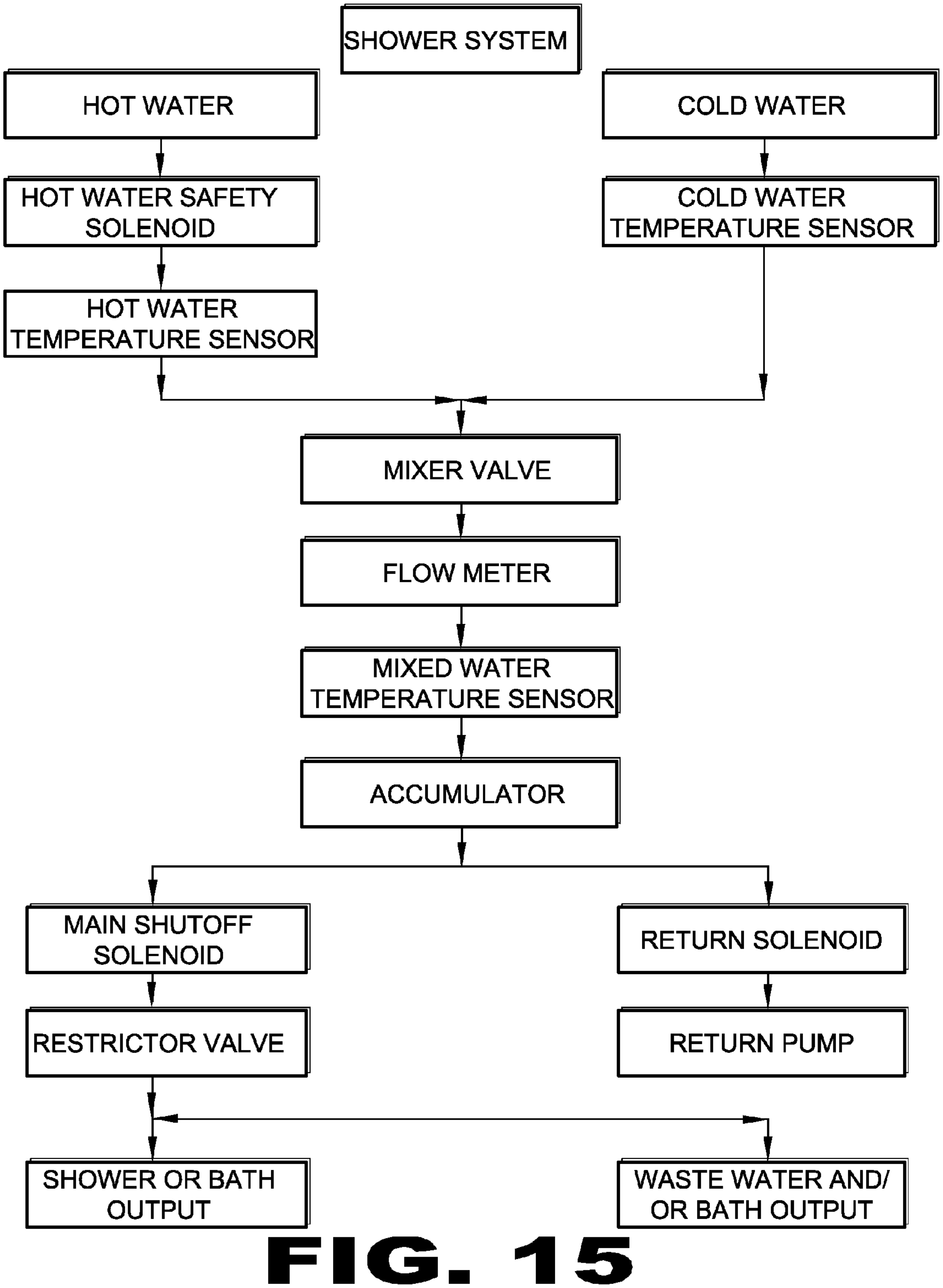
FIG. 15 is a flow chart of the present invention's bath water volume control.

FIG. 15 is a flow chart of the present invention's bath water volume control. Whereby the user controls may be utilized to control the flow and mixing of both the hot and cold water to a desired temperature.

Figure 16:
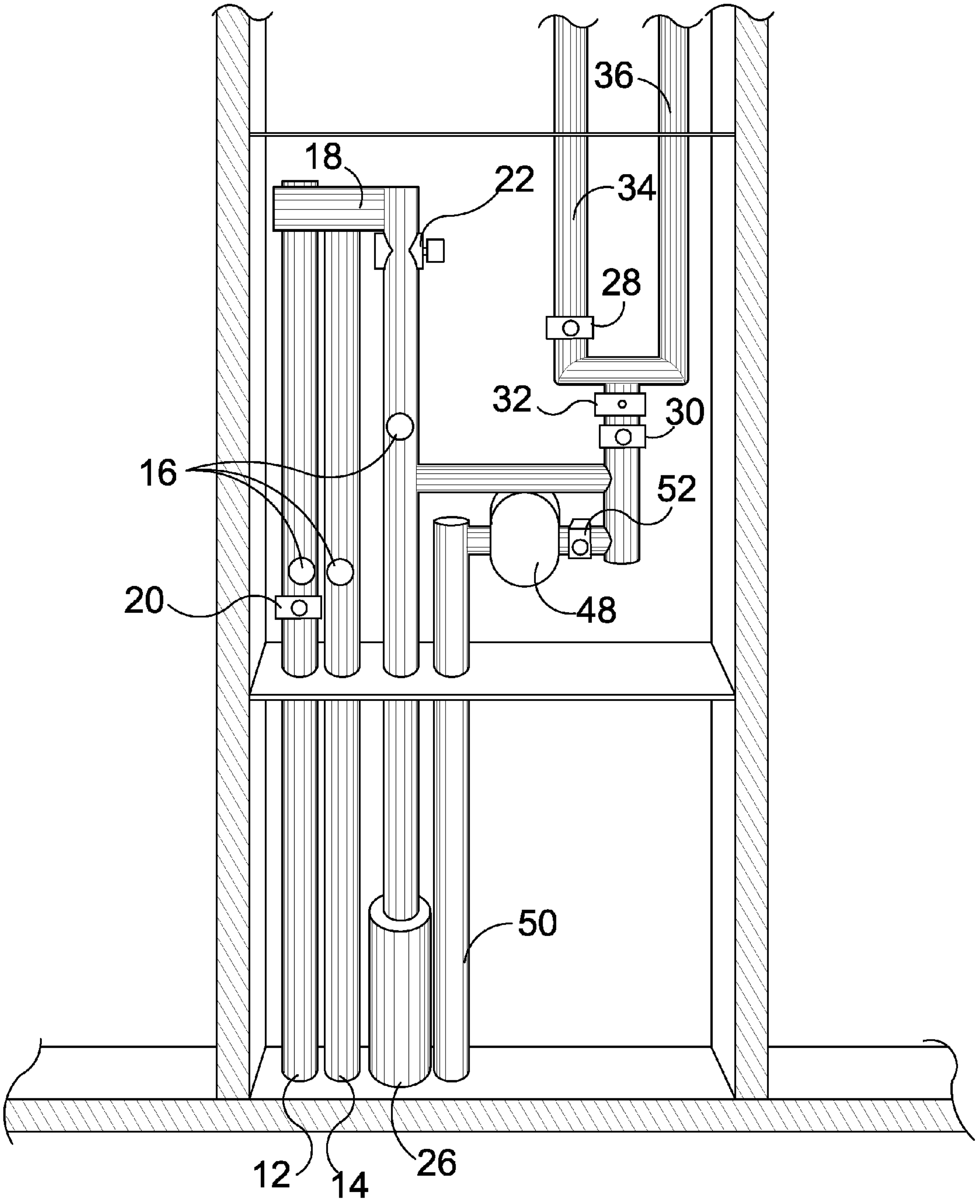
FIG. 16 is front perspective view of the present invention for a bathtub and shower.

FIG. 16 is front perspective view of the present invention for a bathtub and shower. The system starts with a source of hot water 12 from hot water heater 11 and a source of cold 14 with each having a temperature sensor 16 installed prior to connection to a mixer valve 18 with a hot water solenoid 20. A flow meter sensor 22 controls flow rate with a restrictor valve 32 and with a temperature sensor 16 which works in conjunction with the aforementioned mixer valve 18 to maintain a desired temperature. The flow regulation and temperature are user preference indicated by the user through the control panel 24. The accumulator tank 26 shown holds air and water to cushion the system from pressure fluctuations. With the inclusion of a return pump 48, the generic system provides for three outlets labeled 'A'34, 'B' 36, and 'C' 50 wherein 'C' 50 is a return pump 48 for recycling water during system start up until the user parameters of temperature and flow rate are met.

Figure 17:
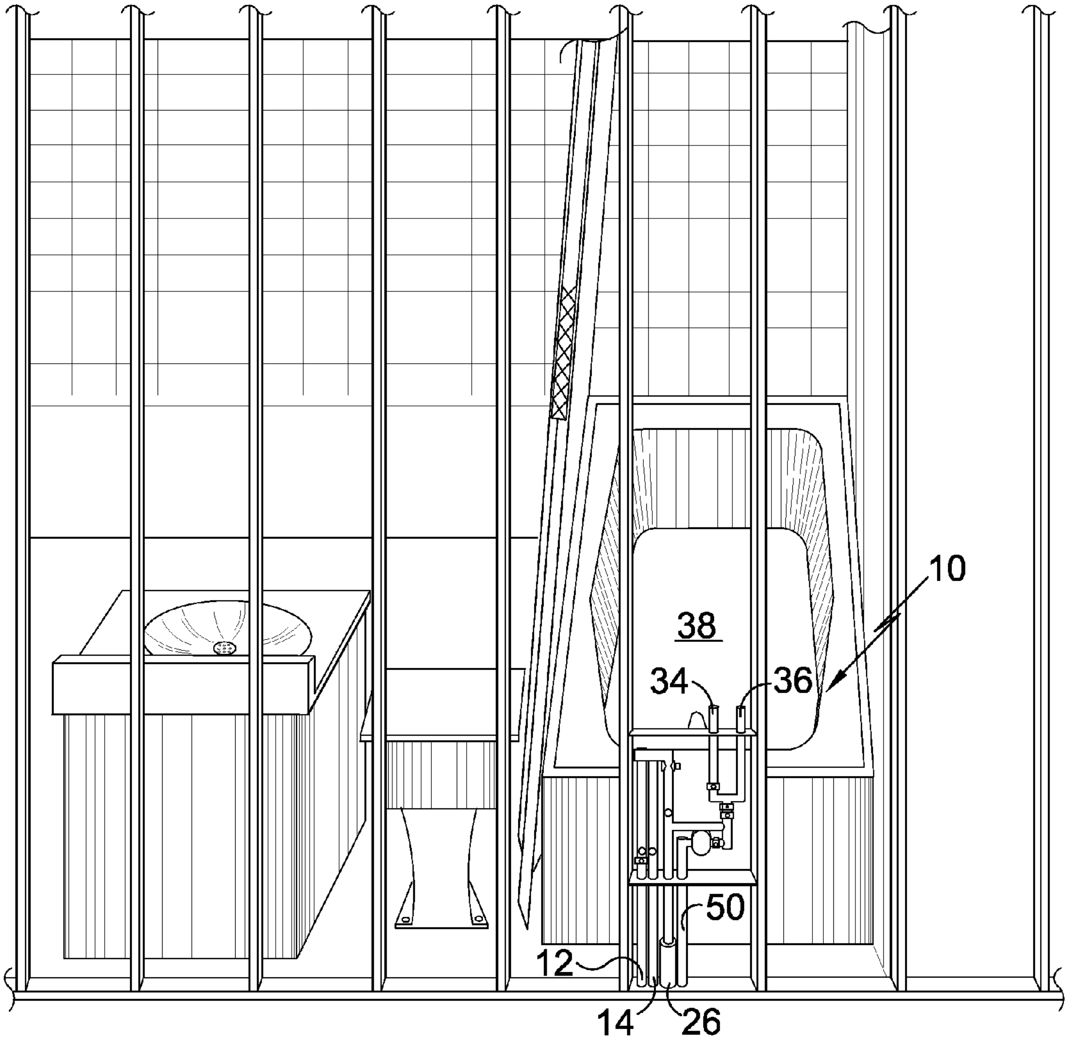
FIG. 17 is front illustrative view of the present invention for a bathtub and shower.
Figure 18:
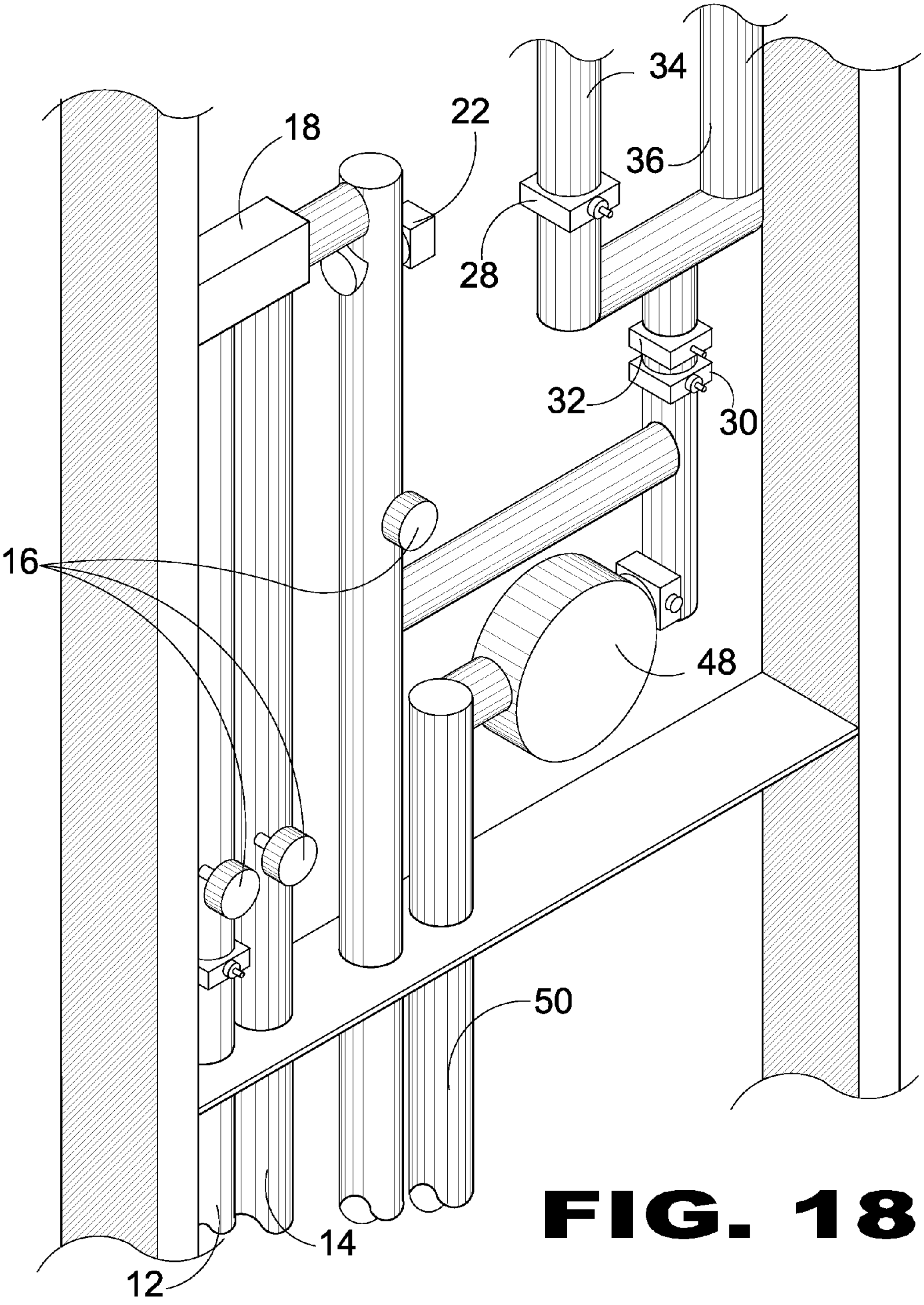
FIG. 18 is perspective view of the present invention.

FIG. 17 is front illustrative view of the present invention for a bathtub and shower. Shown is the present invention 10 incorporating a return pump 48 for a bathtub 38 and shower 40. Additionally shown is a likely configuration and placement of the unit within a buildings or vessels wall FIG. 18 is perspective view of the present invention. Shown is a system for a bath 38 and shower 40 wherein outlet 'A' 34 is channeled to the bathtub and outlet 'B' 36 terminates at the shower head 46. It is provided as a design consideration whether the system channels the water 42 to the bathtub 38 when shower 40 is selected from the control panel 24 until the water 42 reaches the user desired temperature.

Figure 19:
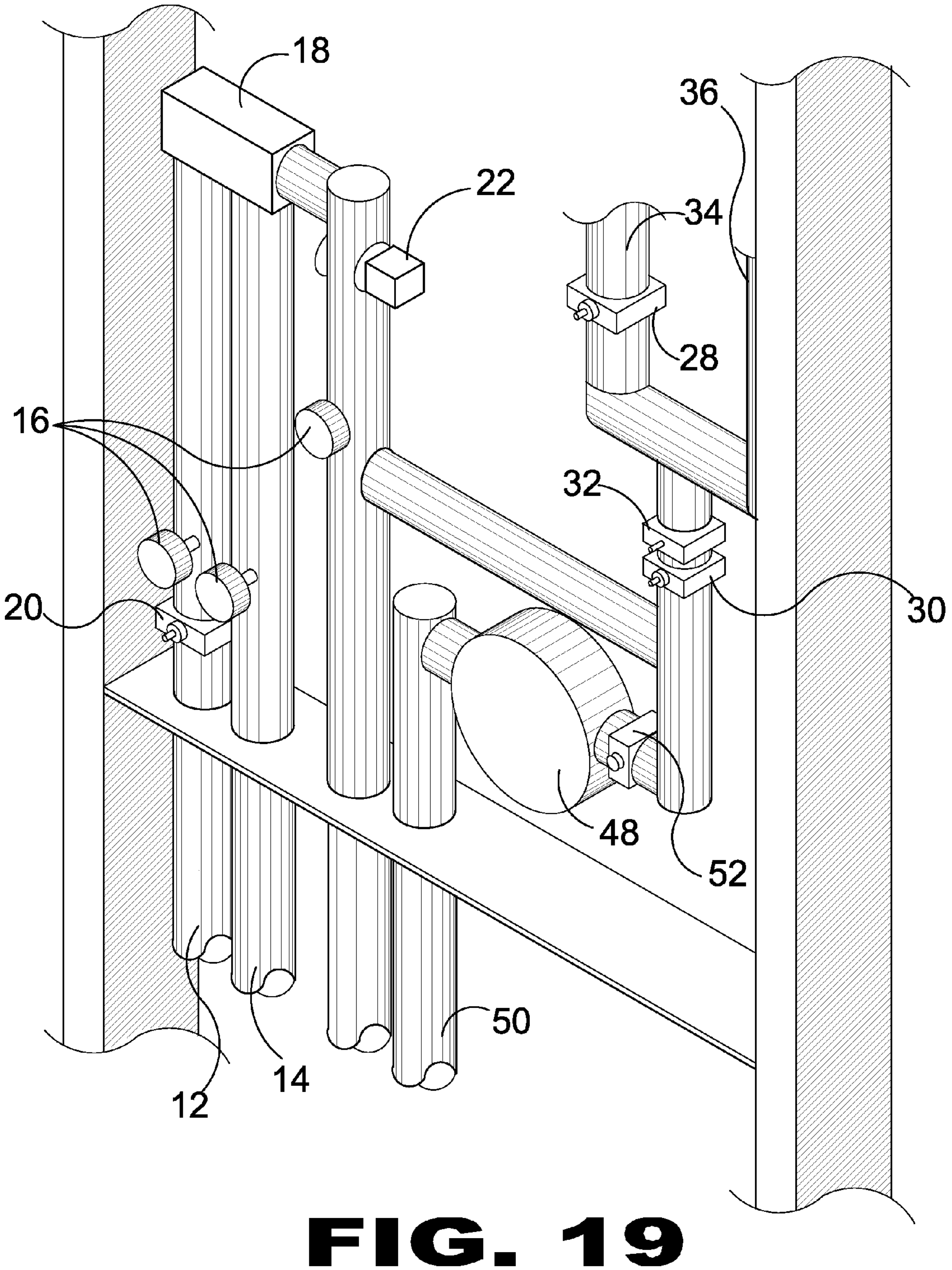
FIG. 19 is perspective view of the present invention.

FIG. 19 is perspective view of the present invention. Shown is a system for a bath 38 and shower 40 wherein outlet 'A' 34 is channeled to the bathtub and outlet 'B' 36 terminates at the shower head 46. It is provided as a design consideration whether the system channels the water 42 to the bathtub 38 when shower 40 is selected from the control panel 24 until the water 42 reaches the user desired temperature.

Figure 20:
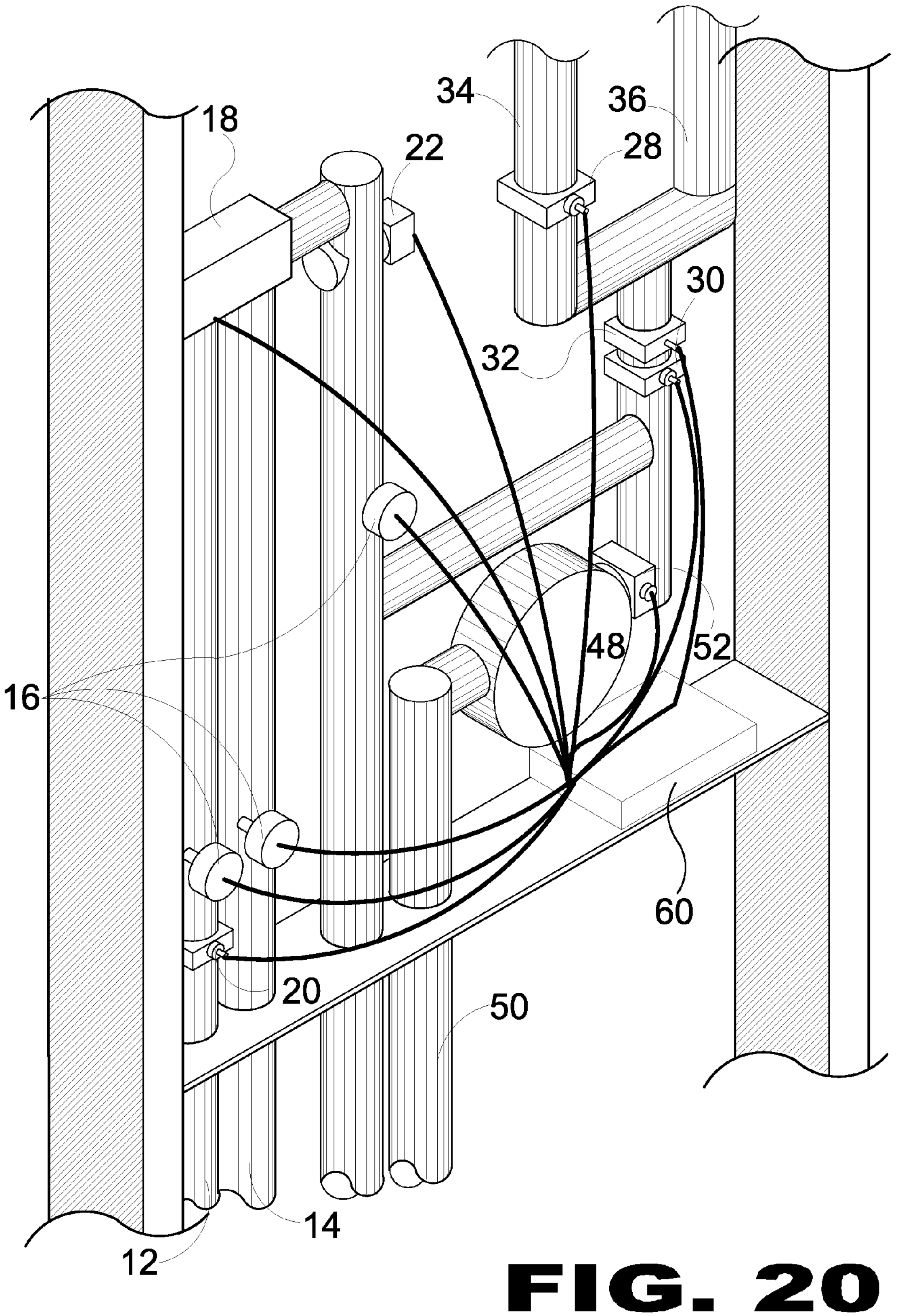
FIG. 20 is perspective view of the present invention.

FIG. 20 is perspective view of the present invention. Shown is a system for a bath 38 and shower 40 wherein outlet 'A' 34 is channeled to the bathtub and outlet 'B'36 terminates at the shower head 46. Additionally shown is on possible configuration for wiring and powering the device.

Figure 21:
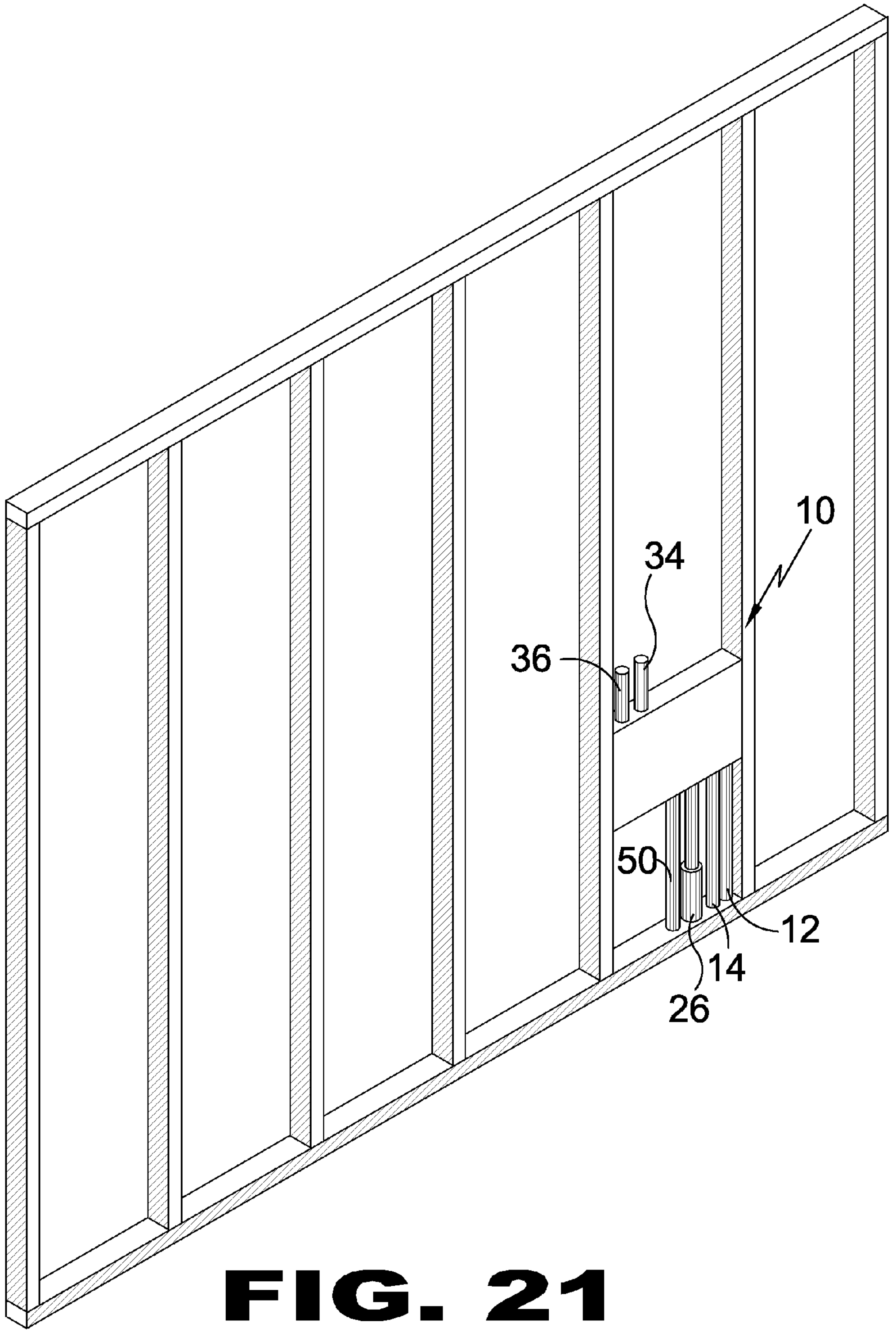
FIG. 21 is perspective view of the present invention in a wall.

FIG. 21 is perspective view of the present invention in a wall. Shown is the present invention 10 incorporating a return pump 48 for a bathtub 38 and shower 40. Additionally shown is a likely configuration and placement of the unit within a buildings or vessels wall.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A water management system for a bathroom, the water management system comprising:

a hot water supply line connected to a hot water heater, said hot water supply line providing hot water;

a cold water supply line providing cold water;

said hot and cold water supply line converging at a mixer valve, said hot water supply line having a first solenoid valve and a first temperature sensor intermediate said mixer valve and said hot water heater, said cold water supply line having a temperature sensor prior to said mixer valve;

a mixed water supply line exiting said mixer valve;

said mixed water supply line connected to first and second outlet lines, said mixed water supply line having a first branch, said first branch terminating in a accumulator tank, said mixed water supply line have a flow meter sensor and a second temperature sensor intermediate said mixer valve and said first branch, said mixed water supply line having a second branch connected to said hot water heater and including a second solenoid valve and a pump, said mixed water supply line having a third solenoid valve and a restrictor valve intermediate said second branch and said first and second outlet lines;

said first outlet line connected to a tub spout and having a solenoid valve;

said second outlet line connected to a shower head; and a central processing unit connected to said pump, said sensors and said valves for controlling the flow and temperature of water exiting said shower head and said tub spout.

2. The water management system recited in claim 1, wherein the water for said shower is diverted to a drain until said water accurately achieves the proper temperature.

3. A water management system for a bathroom in combination with a building wall, the combination comprising:

a building wall with at least first and second opposed studs with a space therebetween;

a water management system positioned in the space between said first and second studs, the system including:

a hot water supply line connected to a hot water heater, said hot water supply line providing hot water;

a cold water supply line providing cold water;

said hot and cold water supply line converging at a mixer valve, said hot water supply line having a first solenoid valve and a first temperature sensor intermediate said mixer valve and said hot water heater, said cold water supply line having a temperature sensor prior to said mixer valve;

a mixed water supply line exiting said mixer valve;

said mixed water supply line connected to first and second outlet lines, said mixed water supply line having a first branch, said first branch terminating in a accumulator tank, said mixed water supply line have a flow meter sensor and a second temperature sensor intermediate said mixer valve and said first branch, said mixed water supply line having a second branch connected to said hot water heater and including a second solenoid valve and a pump, said mixed water supply line having a third solenoid valve and a restrictor valve intermediate said second branch and said first and second outlet lines;

said first outlet line connected to a tub spout and having a solenoid valve;

said second outlet line connected to a shower head; and a central processing unit connected to said pump, said sensors and said valves for controlling the flow and temperature of water exiting said shower head and said tub spout.

* * * * *